US008750827B2

(12) United States Patent  
Pummill et al.

(10) Patent No.: US 8,750,827 B2
(45) Date of Patent: Jun. 10, 2014

(54) LAN-BASED UMA NETWORK CONTROLLER WITH AGGREGATED TRANSPORT

(75) Inventors: Troy T. Pummill, Soquel, CA (US); Kevin Isacks, Fremont, CA (US); Terry Hardie, Union City, CA (US); Talbot Harty, Sutter Creek, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 0 days.

(21) Appl. No.: 13/523,660

(22) Filed: Jun. 14, 2012

(65) Prior Publication Data

US 2013/0064369 A1 Mar. 14, 2013

Related U.S. Application Data

(63) Continuation of application No. 11/432,305, filed on May 10, 2006, now Pat. No. 8,224,333.

(60) Provisional application No. 60/594,827, filed on May 10, 2005.

(51) Int. Cl.
| | |
|---|---|
| *H04W 12/08* | (2009.01) |
| *H04W 12/12* | (2009.01) |
| *H04W 12/06* | (2009.01) |
| *H04W 12/10* | (2009.01) |
| *H04L 29/06* | (2006.01) |
| *H04L 9/00* | (2006.01) |
| *H04M 1/66* | (2006.01) |

(52) U.S. Cl.
USPC ................... 455/410; 713/150; 713/156

(58) Field of Classification Search
CPC ..... H04W 12/08; H04W 12/12; H04W 12/06; H04W 12/10; H04W 84/045; H04L 63/0428; H04L 63/0823; H04L 9/3263; H04L 29/06; H04L 9/00; H04M 1/66
USPC ............ 455/410; 713/150, 156; 712/150, 156
See application file for complete search history.

(56) References Cited

U.S. PATENT DOCUMENTS 6,101,380 A 8/2000 Sollee
6,278,697 B1 8/2001 Brody et al.
(Continued)

FOREIGN PATENT DOCUMENTS

| CN | 1547405 A | 11/2004 |
|---|---|---|
| GB | 2367213 A | 3/2002 |
| WO | WO 2004/032554 A1 | 4/2004 |

OTHER PUBLICATIONS

3GPP TS 43.318 V6.1.0 3rd Generation Partnership Project; Technical Specification Group GSM/EDGE Radio Access Network; Generic access to the A/Gb interface; Stage 2 (Release 6) Apr. 2005 Retrieved from ftp://ftp.3gpp.org/Specs/archive/43_series/43.318/.

(Continued)

*Primary Examiner* — Inder Mehra
(74) *Attorney, Agent, or Firm* — Straub & Pokotylo; Michael P. Straub; Stephen T. Straub

(57) ABSTRACT

A method for managing UMA communications within a local area network and a network controller includes establishing a first connection between a first UMA device and a LAN-based UMA network controller (LAN-UNC) and establishing a second connection between a second UMA device and the LAN-UNC. The first and second connections are carried over the local area network. The first and second UMA devices are connected to the same local area network. The method provides establishing a third connection between the LAN-UNC and a UMA network controller (UNC). The UNC is connected to an external network and the third connection extends over the external network. The method includes transporting packets received using the first and second connections to the UNC using the third connection. Packets received using the third connection are transported to the first UMA device using the first connection and to the second UMA device using the second connection.

15 Claims, 39 Drawing Sheets

(56) References Cited

U.S. PATENT DOCUMENTS

| | | |
|---|---|---|
| 6,587,457 B1 | 7/2003 | Mikkonen |
| 6,769,000 B1 | 7/2004 | Akhtar et al. |
| 6,779,051 B1 | 8/2004 | Basil et al. |
| 7,200,383 B2 | 4/2007 | Eronen |
| 7,272,397 B2 | 9/2007 | Gallagher et al. |
| 7,280,826 B2 | 10/2007 | Nylander et al. |
| 7,421,268 B2 | 9/2008 | Lee et al. |
| 7,441,043 B1 | 10/2008 | Henry et al. |
| 7,565,144 B2 | 7/2009 | Saifullah et al. |
| 7,664,081 B2 | 2/2010 | Luoma et al. |
| 7,873,015 B2 | 1/2011 | Gallagher et al. |
| 7,885,659 B2 | 2/2011 | Pummill et al. |
| 7,936,721 B2 | 5/2011 | Hallenstal et al. |
| 7,953,423 B2 | 5/2011 | Gallagher et al. |
| 8,224,333 B2 * | 7/2012 | Pummill et al. ............. 455/445 |
| 2002/0025798 A1 | 2/2002 | Titmuss et al. |
| 2002/0075844 A1 | 6/2002 | Hagen |
| 2002/0191548 A1 | 12/2002 | Ylonen et al. |
| 2003/0039234 A1 | 2/2003 | Sharma et al. |
| 2003/0119490 A1 | 6/2003 | Mohammed |
| 2003/0176186 A1 | 9/2003 | Mohammed |
| 2003/0225893 A1 | 12/2003 | Roese et al. |
| 2003/0233461 A1 | 12/2003 | Mariblanca-Nieves et al. |
| 2004/0073641 A1 | 4/2004 | Minhazuddin et al. |
| 2004/0116120 A1 | 6/2004 | Gallagher et al. |
| 2004/0199614 A1 | 10/2004 | Shenfield et al. |
| 2004/0259541 A1 * | 12/2004 | Hicks et al. .............. 455/426.1 |
| 2005/0101293 A1 * | 5/2005 | Mentze et al. ................ 455/410 |
| 2005/0114652 A1 * | 5/2005 | Swedor et al. ............... 713/156 |
| 2005/0160161 A1 | 7/2005 | Barrett et al. |
| 2005/0197965 A1 | 9/2005 | Takabayashi et al. |
| 2005/0272449 A1 | 12/2005 | Gallagher et al. |
| 2005/0286466 A1 | 12/2005 | Tagg et al. |
| 2006/0021036 A1 | 1/2006 | Chang et al. |
| 2006/0094431 A1 | 5/2006 | Saifullah et al. |
| 2006/0120361 A1 * | 6/2006 | Sharma et al. ................ 370/386 |
| 2006/0133414 A1 | 6/2006 | Luoma et al. |
| 2006/0198347 A1 | 9/2006 | Hurtta et al. |
| 2006/0211448 A1 | 9/2006 | Reiss et al. |
| 2006/0239277 A1 | 10/2006 | Gallagher |
| 2006/0276137 A1 | 12/2006 | Pummill et al. |
| 2006/0276139 A1 | 12/2006 | Pummill et al. |
| 2007/0274266 A1 * | 11/2007 | Oyama et al. ................ 370/335 |
| 2007/0286132 A1 | 12/2007 | Vikberg et al. |
| 2008/0043686 A1 * | 2/2008 | Sperti et al. .................... 370/338 |
| 2008/0052769 A1 | 2/2008 | Leone et al. |
| 2009/0075660 A1 | 3/2009 | Hallenstal et al. |
| 2009/0149157 A9 | 6/2009 | Gallagher et al. |
| 2009/0275332 A1 | 11/2009 | Niska et al. |

OTHER PUBLICATIONS

Office Action dated Feb. 25, 2013 from Canadian Patent Office in connection with Canadian Patent Application No. 2,606,965 pp. 1-4.

Bäckström, Martin, et al. "Mobile@Home-GSM services over wireless LAN", Ericsson Review, Nov. 2005, p. 92-99, vol. 2.

Dell'Uomo, L. et al., "The mobility management and authentication/authorization mechanisms in mobile networks beyond 3G," Proceedings of the 12th IEEE International Symposium on Personal, Indoor and Mobile Radio Communications, 2001, vol. 1 pp. C-44-C-48, Sep. 30-Oct. 3, 2001.

Gupta Rajeev. "Path to Cellular/WLAN convergence crosses UMA", Mar. 2006, downloaded from URL: http://www.eetasia.com/AR-TICLES/2006MAR/PDF/EEOL2006MAR01 RFD NETD TA 01.pdt.

Laine, Ph., et al. "Network Models for Converged Fixed and Mobile Telephony" (Technical Paper), Alcatel Telecommunications Review, No. 1, p. 43-47. Publisher: Compagnie Financiere Alcatel, Mar. 29, 2005.

Mlinarsky, F., et al. "Cellular or WiFi?", Test & Measurement World, Apr. 2005, p. 37-42, vol. 25, No. 3.

Ooghe, S., et al. "Supporting Quality of Service in Broadband Access Networks", (Technical Paper) Alcatel Telecommunications Review, No. 2:1280133. Publisher: Compagnie Financiere Alcatel, May 1, 2005.

Schultzrinne, H., et al. "IEFTF-STD-0064 RTP: A Transport Protocol for Real-Time Applications", Jul. 2003, p. 1-93.

Stanley, D., et al. "Extensible Authentication Protocol (EAP) Method Requirements for Wireless LANs", The Internet Society (Mar. 2005), pp. 1-15.

UMA User Perspective (Stage 1) R1.0.0 (Technical Specification), Sep. 1, 2004, pp. 1-29.

UMA User Perspective (Stage 2) R1.0.4 (Technical Specification), May 5, 2005, p. 1-87.

UMA User Perspective (Stage 3) R1.0.4 (Technical Specification), May 5, 2005, p. 1-162.

Non-Final Office Action for U.S. Appl. No. 11/432,280, mailed on Sep. 11, 2009, 17 pages.

Final Office Action for U.S. Appl. No. 11/432,280, mailed on May 24, 2010, 21 pages.

Notice of Allowance for U.S. Appl. No. 11/432,280, mailed on Sep. 29, 2010, 9 pages.

Ex-Part Quayle Action for U.S. Appl. No. 11/432,302, mailed on Jul. 2, 2009, 5 pages.

Non-Final Office Action for U.S. Appl. No. 11/432,302, mailed on Jul. 2, 2009.

Non-Final Office Action for U.S. Appl. No. 11/432,302, mailed on Mar. 16, 2010, 5 pages.

Ex-Part Quayle Action for U.S. Appl. No. 11/432,302, mailed on Sep. 28, 2010, 5 pages.

Non-Final Office Action for U.S. Appl. No. 11/432,302, mailed on Aug. 18, 2011, 6 pages.

Notice of Allowance for U.S. Appl. No. 11/432,302, mailed on Dec. 5, 2011, 11 pages.

Non-Final Office Action for U.S. Appl. No. 11/432,305, mailed on Jul. 20, 2009, 19 pages.

Final Office Action for U.S. Appl. No. 11/432,305, mailed on Mar. 12, 2010, 20 pages.

Non-Final Office Action for U.S. Appl. No. 11/432,305, mailed Jun. 22, 2010, 24 pages.

Final Office Action for U.S. Appl. No. 11/432,305, mailed on Dec. 8, 2010, 27 pages.

Non-Final Office Action for U.S. Appl. No. 11/432,305, mailed on Jun. 23, 2011, 31 pages.

Notice of Allowance for U.S. Appl. No. 11/432,305, mailed on Jan. 6, 2012, 5 pages.

Notice of Allowance for U.S. Appl. No. 11/432,305, mailed Mar. 14, 2012, 5 pages.

International Search Report for PCT/US2006/18146, mailed on Jul. 17, 2007, 3 pages.

Supplementary European Search Report for European Patent Application No. EP06670206 (Sep. 23, 2011).

US 2006/0276138 A1, 12/2006, Pummill et al. (withdrawn)

* cited by examiner

Device Location Table — 300

| GSM Device | SIP Device | H323 Device |
|---|---|---|
| 555-1212 | tom@lan.com | 129.47.1.1 |
| 555-1213 | | |
| 555-1214 | | |

LAN-BASED UMA NETWORK CONTROLLER WITH AGGREGATED TRANSPORT

CROSS-REFERENCES TO RELATED APPLICATIONS

This application is a continuation of U.S. patent application Ser. No. 11/432,305, filed May 10, 2006, which claims priority to U.S. Provisional Application No. 60/594,827, filed May 10, 2005, all of which are incorporated herein by reference in their entirety.

The following two applications are also incorporated herein by reference in their entirety:

U.S. patent application Ser. No. 11/432,280, filed May 10, 2006 by Troy T. Pummill, Kevin Isacks, Terry Hardie, and Talbot Harty, for "LAN-BASED UMA NETWORK CONTROLLER WITH LOCAL SERVICES SUPPORT"; and U.S. patent application Ser. No. 11/432,302, filed May 10, 2006 by Troy T. Pummill, Kevin Isacks, Terry Hardie, and Talbot Harty, for "LAN-BASED UMA NETWORK CONTROLLER WITH PROXY CONNECTION".

BACKGROUND OF THE INVENTION

Unlicensed mobile access (UMA) technology provides a link between GSM/GPRS cellular networks and IP-based wireless access networks. This link enables a cellular provider to offer the same voice and data services regardless of whether the services are delivered by a cellular base station or an IP network. Built-in handover mechanisms and mobility management features make it possible to transition between the two access methods without interrupting service.

In a typical implementation, a UMA network controller (UNC) passes voice and data signals between a mobile station and the core cellular network. The UNC receives UMA packets from the mobile station over an IP network, converts them into a suitable format, and directs them to the core cellular network. The core cellular network receives voice traffic at a standard A-interface and data traffic at a standard Gb-interface. In the other direction, the cellular core signals the UNC at its interfaces, the UNC converts these signals into packets, and the UNC sends the packets to the mobile station over the IP network. The entire process is transparent to both the mobile station and the cellular core. From the mobile station's perspective, the wireless network is simply an additional radio resource. IP-specific functionality is abstracted from the higher level service and control logic. The core cellular network, on the other hand, interacts with the UNC as if it was a conventional base station. At a high level, the UMA network functions as a single cell within the larger cellular network.

The UNC participates in a process of authentication whereby the mobile station is granted access to the core cellular network. As a part of this process, the mobile station contacts the UNC at an address on the IP network. The UNC contacted may or may not be the UNC that serves the geographic area in which the mobile station is located. A mobile station may contact multiple UNCs before locating the serving UNC and becoming registered as part of the UMA network. A security gateway at the serving UNC employs a challenge-response mechanism to authenticate the mobile station. As part of this process, the mobile station exchanges encrypted communications with the core cellular network. The encrypted communications contain information derived from a subscriber identity module (SIM) located within the mobile station. When authentication is successfully completed, the serving UNC provides system information to the mobile station so that its availability at the UMA network cell can be registered with the core cellular network.

After registration is complete, signaling and bearer traffic flow between the mobile station and the serving UNC through an IPsec (IP Security) tunnel When the mobile station wishes to place a call, for example, it sends UMA packets to the serving UNC requesting a connection. The serving UNC notifies a mobile switching center (MSC) in the core cellular network. The MSC then directs the serving UNC to create a voice path from the mobile station to a voice port on its A-interface. The serving UNC responds by creating a Voice over IP (VoIP) bearer path to the mobile station. Audio is transported back and forth across the IP network as a VoIP data flow on the bearer path. When the serving UNC receives audio data from the mobile station, it is transcoded and directed to a voice port at the A-interface. Similarly, when the serving UNC receives audio data from the MSC, it is transcoded and sent to the mobile station over the bearer path. All communications are passed through the IPsec tunnel for security.

GPRS data services are also available on the UMA network. When a mobile station wishes to access these services, it creates a transport channel to the serving UNC. The transport channel carries GPRS payload packets between the mobile station and the serving UNC. The serving UNC forwards payload packets received from the mobile station to a serving GPRS support node (SGSN) through its Gb interface. In like manner, the serving UNC receives GPRS packets from the SGSN and forwards them to the mobile station over the transport channel.

FIG. 1 illustrates the operation of a conventional UMA communication system. UMA communication system 100 is shown as including, in part, mobile stations 108, 110 and local area network (LAN) 104. LAN 104 includes workstations 116, 117 and application server 118. An internet connection 120 is also provided. Mobile stations 108, 110 connect to LAN 104 through a wireless access point 112.

When mobile station 108 wishes to place a UMA call, for example, it connects to LAN 104 and begins a process of authentication with the core cellular network through a serving UNC 124. This process results in formation of a secure tunnel between the devices. At this point, mobile station 108 communicates with serving UNC 124 by sending and receiving UMA packets through the secure tunnel. These packets represent GSM/GPRS signaling and bearer traffic. Depending upon the type of communication, serving UNC 124 relays packet data either to MSC 128 or SGSN 132 where it is presented to the core cellular network. Return communications follow the same path from the core cellular network to the mobile station.

As shown and described, conventional UMA communication system 100 neglects the resources and functionality of local area network 104. Regardless of caller/callee, all voice communications follow a path from sender, across the internet, to the UNC, and back down to the recipient. This is true even if both devices are connected to the same local area network. Thus, if mobile station 108 wishes to call mobile station 110, audio data from mobile station 108 will be transmitted to the local area network 104, traverse the internet 120, and be received at serving UNC 124. Serving UNC 124 will return the audio data over the internet 120 to the local area network 104 where it will ultimately be received by mobile station 110. This process uses network bandwidth inefficiently, introduces delay into UMA voice calls, and potentially degrades call quality.

In addition, by neglecting LAN resources, UMA devices in a conventional system are not able to communicate efficiently with other LAN-based communication devices. For example, a LAN may support interoperability among numerous SIP, H.323, and TDM based communication devices through one or more media gateways. UMA devices do not benefit from this shared connection. As described, UMA communications always traverse the internet before reaching their intended recipients. Thus, there is a need in the art for a LAN-centric approach to UMA communications. It is therefore an object of the present invention to promote efficient voice and data communications for UMA-enabled devices connected to the same local area network. It is also an object of the present invention to promote efficient communication between UMA and non-UMA communication devices when these devices are connected to the same local area network.

BRIEF SUMMARY OF THE INVENTION

A method for managing UMA communications within a local area network and a network controller are disclosed. The method includes establishing a first connection between a first UMA device and a LAN-based UMA network controller (LAN-UNC) and establishing a second connection between a second UMA device and the LAN-UNC. The first and second connections are carried over the local area network. The first and second UMA devices are connected to the same local area network. The method provides establishing a third connection between the LAN-UNC and a UMA network controller (UNC). The UNC is connected to an external network and the third connection extends over the external network. The method includes transporting packets received using the first and second connections to the UNC using the third connection. Packets received using the third connection are transported to the first UMA device using the first connection and to the second UMA device using the second connection.

According to another embodiment, the third connection comprises an IPsec tunnel. The IPsec tunnel formation process may be performed manually or automatically. In one embodiment, the LAN-UNC detects a USB-SIM device and initiates an automated IPsec tunnel formation process. The third connection may transport authentication packets between the first UMA device and the UNC. Authentication packets may be exchanged as part of a process whereby the first UMA device is authorized to access a cellular network. In some embodiments, LAN-UNC monitors the authentication process and detects when it has been successfully completed. The first UMA device may provide cellular triplets to LAN-UNC to facilitate monitoring the authentication process. Alternatively, the UNC may provide the cellular triplets.

In one embodiment, the method includes forming a multiplexed packet with data from packets received on the first and second connections and sending the multiplexed packet to the UNC on the third connection. In additional embodiments, the packets transported using the third connection are compressed and otherwise optimized.

BRIEF DESCRIPTION OF THE DRAWINGS

FIG. 3 shows an exemplary device location table maintained by a LAN-based UMA network controller according to an embodiment of the present invention.

DETAILED DESCRIPTION OF THE INVENTION

Figure 1:
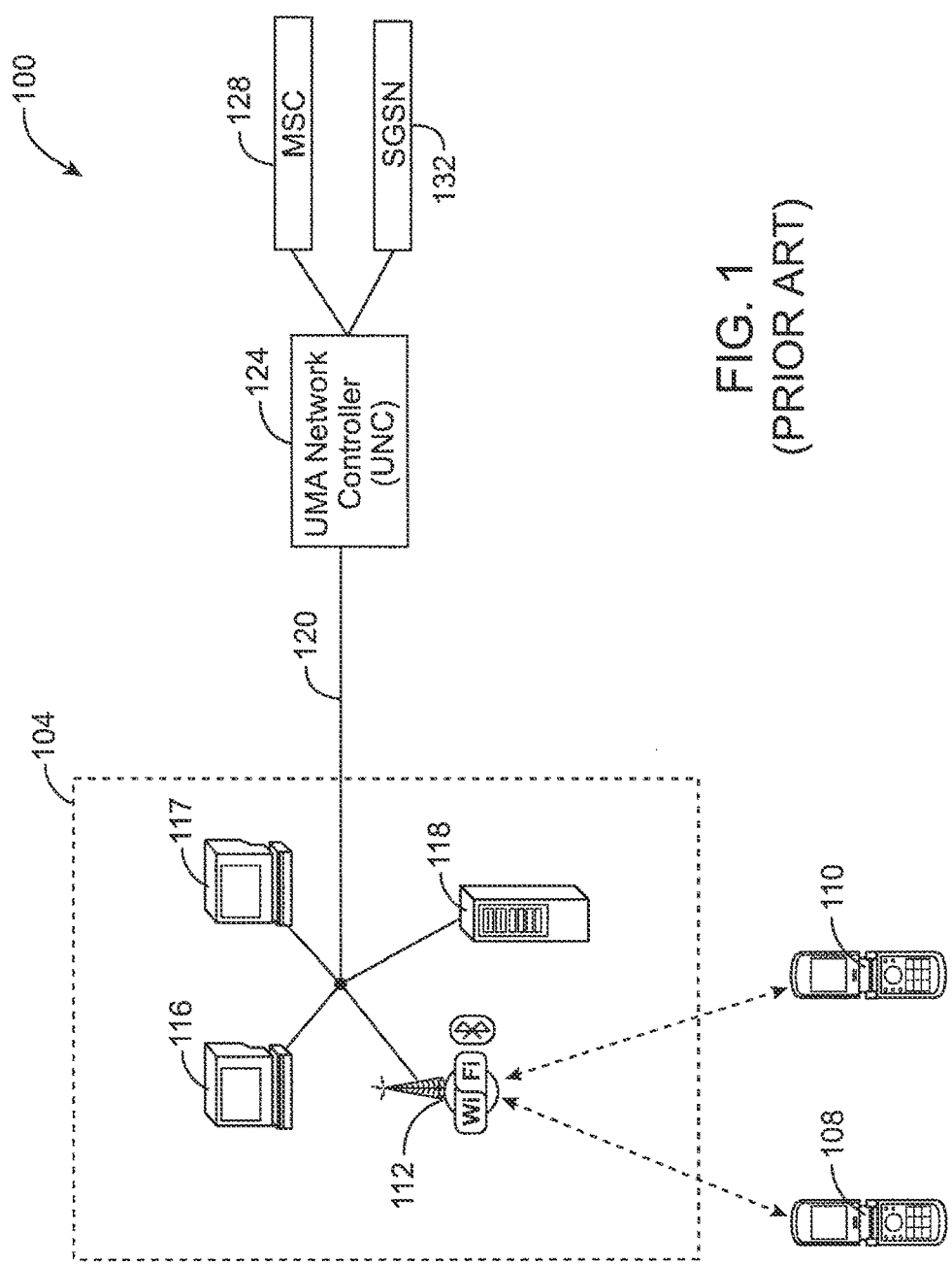
FIG. 1 is a diagram of a UMA communication system as known in the prior art.
Figure 2:
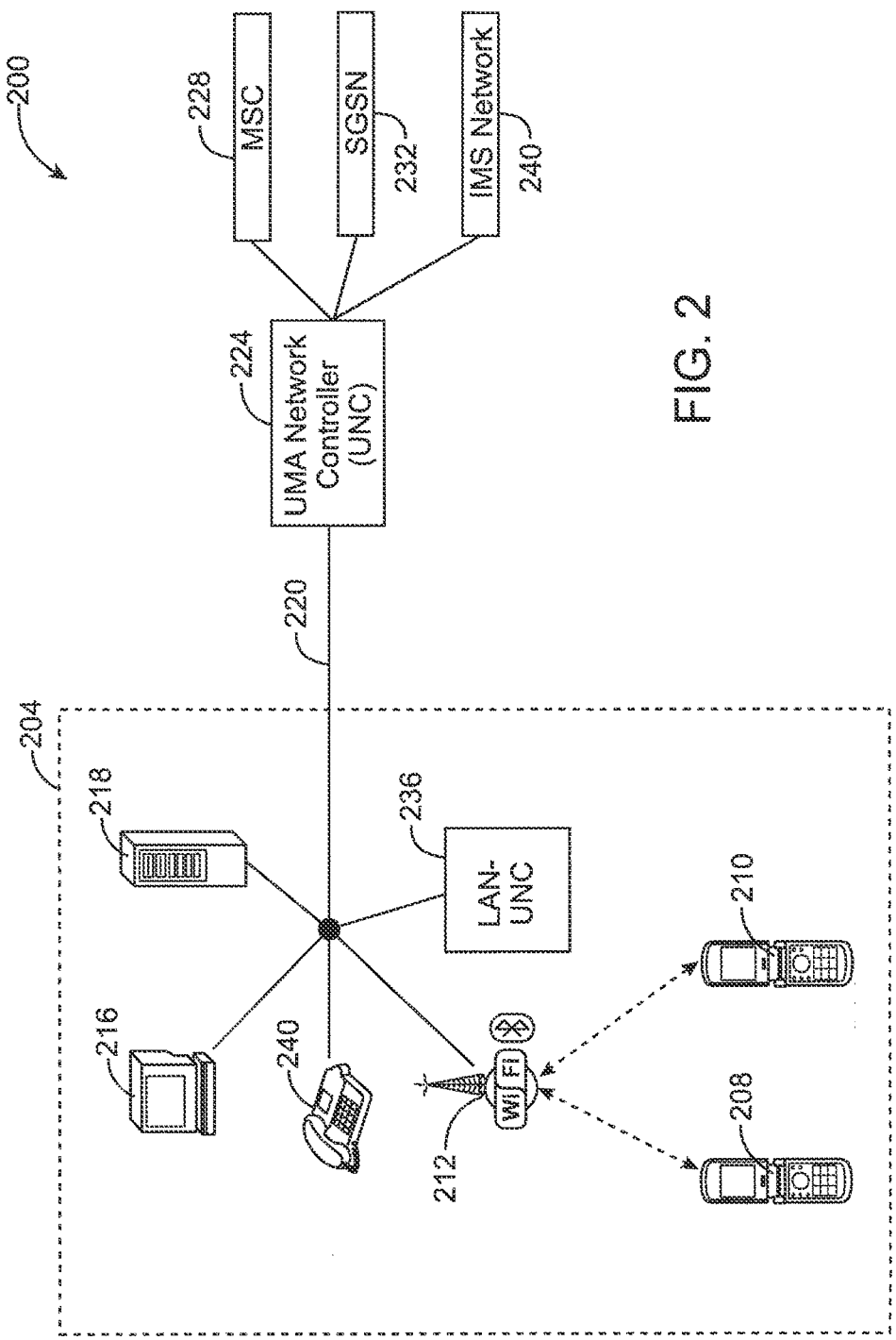
FIG. 2 depicts a LAN-based UMA network controller (LAN-UNC) operating as part of a UMA communication system in accordance with an embodiment of the present invention.

FIG. 2 shows a LAN-based UMA network controller 236 (LAN-UNC) operating as part of a UMA communication system according to an embodiment of the present invention. In this arrangement, local area network 204 may represent an enterprise network and may support various computing and communication devices. As shown, local area network 204 includes workstation 216 and application server 218. Application server 218 provides data services to devices that are connected to LAN 204. Devices connected to LAN 204 may communicate over an external network 220 by exchanging IP (Internet Protocol) packets.

UMA devices 208, 210, 240 are also part of local area network 204. Mobile stations 208, 210 connect to LAN 204 through wireless access point 212. Access point 212 provides a means for wireless devices in its coverage area to connect to LAN 204 and may perform other routing and security related functions. Access point 212 may accept connections from WiFi, WiMax, Bluetooth, and other wireless-enabled devices. UMA phone 240 is a fixed-line device that includes an integrated UMA client and communicates over a UMA network (UMAN) in the same way as conventional UMA devices. In some embodiments, UMA phone 240 is an Ethernet device.

LAN-UNC 236 is also connected to local area network 204 and disposed to receive packets from UMA devices 208, 210, 240. Packets sent by UMA devices 208, 210, 240 pass through LAN-UNC 204 before they reach external network 220. Similarly, packets arriving from external network 220 are received by LAN-UNC 236 before they reach UMA devices 208, 210, 240.

I. Local Communications

A. Call Audio

In an exemplary embodiment, LAN-UNC 236 monitors packets exchanged by UMA devices 208, 210, 240. If it detects that packets received from a UMA device 208, 210, 240 represent a call, LAN-UNC 236 may examine the packets to determine whether the called party is connected to local area network 204. For example, mobile station 208 may request a call using standard UMA connection management procedures. This request may be expressed as one or more UMA messages intended for a serving UNC 224. LAN-UNC 236 receives packets containing these UMA messages and detects that mobile station 208 is requesting a UMA call.

When the call is detected, LAN-UNC 236 continues to monitor packets exchanged by mobile station 208 and intercepts a unique identifier associated with the called party. The unique identifier may include, for example, the IMSI (international mobile subscriber identity) of the called party. LAN-UNC 236 may use the unique identifier to determine whether the called party is connected to local area network 204. If LAN-UNC 236 determines that the called party is not connected to LAN 204, it may pass packets from mobile station 208 to serving UNC 224 without further processing. If, however, LAN-UNC 236 determines that the called party is connected to local area network 204, it may perform additional processing of the call traffic. Additional call processing may include redirecting call audio data.

In some embodiments, LAN-UNC 236 allows the call setup process to proceed normally and then redirects the audio stream. Thus, for example, LAN-UNC 236 sends the call request to serving UNC 224 where is relayed to a mobile switching center 228. Mobile switching center (MSC) 228 directs serving UNC 224 to establish a connection between mobile station 208 and a specified port on its A-interface. When call setup has completed, LAN-UNC 236 receives call audio packets from mobile station 208 and transfers them to the called party within local area network 204. Thus, unlike conventional systems, packets representing call audio data are maintained within local area network 204 when both caller and callee are connected to local area network 204. The process through which LAN-UNC 236 maintains call audio packets within local area network 204 is variously described hereinafter as "localizing" or "short-cutting" the call audio data. Localizing call audio is performed when both parties to a call are connected to the same local area network.

B. Device Location Table

As UMA devices 208, 210, 240 successfully complete the discovery and registration process, LAN-UNC 236 may add entries to a device location table. Entries in the device location table may include, for example, the IMSI of the fully registered UMA device and may indicate that the device is actively connected to local area network 204. If a UMA device 208, 210, 240 disconnects from local area network 204, LAN-UNC 236 may remove its information from the device location table. In addition, LAN-UNC 236 may periodically update information stored in the device location table in response to system events and other occurrences.

Figure 3:
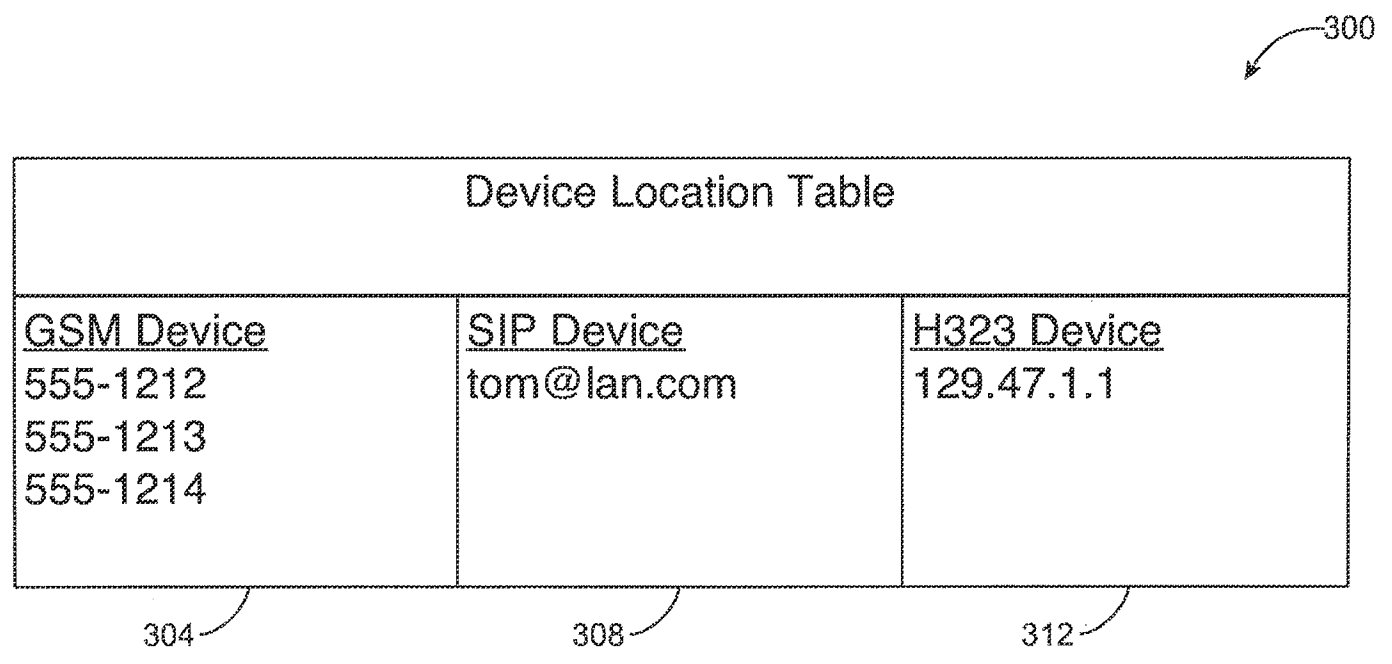

FIG. 3 shows an exemplary device location table 300 maintained by a LAN-based UMA network controller according to an embodiment of the present invention. As shown, device location table 300 is a generalized data structure containing information about communication devices connected to a local area network. In some embodiments, entries in device location table 300 contain, at least, a unique identifier associated with a particular communication device connected to the local area network. The format of the unique identifier may vary according to device type and, in some embodiments, includes an email address, an IP address, or a telephone number. Additional information, such as device type, device location, call status, and usage statistics may also be stored in device location table 300. Although shown as a table, it will be understood by those skilled in the relevant art that device location table 300 may comprise other data structures without departing from spirit of the present invention.

When a call request is detected, LAN-UNC 236 may search a device location table for an entry that matches the call recipient's unique identifier. If no matching entry is found, this may indicate that the call recipient is not connected to local area network 204 or has not been properly registered on the UMA network. If a matching entry is found, however, this indicates that the call is being placed between registered UMA devices and that both of the devices are connected to local area network 204. Thus, if both mobile stations 208, 210 are connected to LAN 204 and both are properly registered on the UMA network, entries for both devices will be included in the device location table. By using information in the device location table, a LAN-UNC 236 may determine when it is appropriate to localize call audio data. A device location table may also facilitate communication between UMA and non-UMA devices connected to the same local area network as discussed in more detail below.

C. Keep-Alive Packets

In some embodiments, LAN-UNC 236 is configured to send placeholder audio packets to serving UNC 224 when it localizes call audio data. For example, LAN-UNC 236 may generate dummy RTP (Real-time Transport Protocol) packets to simulate call audio data and send them to serving UNC 224 at predetermined intervals. These dummy RTP packets ensure that a viable voice path exists between LAN-UNC 236 and serving UNC 224 and may be used to facilitate hand-over between the UMA network and the cellular network. By way of illustration, LAN-UNC 236 may begin localizing audio data for a call placed between a first mobile station 208 and a second mobile station 210. During the call, second mobile station 210 may disconnect from local area network 204 and be handed-over to the cellular network. This process may occur, for example, if second mobile station 210 leaves the coverage area of wireless access point 212. Mobility management features in second mobile station 210 may detect reduced signal strength on the wireless network connection and initiate a hand-over to the appropriate cellular base station.

When LAN-UNC 236 detects that second mobile station 210 has requested a hand-over, it may discontinue sending placeholder audio packets and begin sending audio packets from first mobile station 208 to serving UNC 224 on the voice path. Since only first mobile station 208 remains connected to local area network 204, the call proceeds in the normal fashion. Audio data from first mobile station 208 is carried by internet connection 220 to serving UNC 224. MSC 228 receives the call audio from serving UNC 224 and sends it to the appropriate cellular base station. The cellular base station transmits the call over the air and it is received by second mobile station 210. On the return trip, call audio data is received from second mobile station 210 at the base station. MSC 228 directs the call to serving UNC 224 and it is then forwarded to LAN-UNC 236. LAN-UNC 236 delivers the call to first mobile station 208. In this way, call audio data is de-localized in response to the hand-over event.

D. Data

UMA devices 208, 210, 240 may also generate requests for data services such as web browsing or email. In some embodiments, LAN-UNC 236 detects these requests and determines whether they can be fulfilled using LAN-based resources. For example, LAN-UNC 236 may communicate with application server 218. If application server 218 can fulfill a data services request, LAN-UNC 236 may establish a connection and route data traffic between the UMA device and application server 218 over the local area network 204. LAN-UNC 236 may be configured to route some requests for data services to application server 218 over LAN 204 and to route other requests for data services to serving UNC 224 and on to SGSN 232. This expands the set of data services available to UMA devices 208, 210, 240 and permits preference-based resource selection. In an exemplary embodiment, LAN-UNC 236 supports communication with IMS network 240 for accessing data services.

II. Authentication

Interaction between a LAN-UNC and a UMA device typically begins with an authentication process. As part of the authentication process, the UMA device provides its credentials to the core cellular network. If the cellular network accepts the credentials, a secure communication channel is formed and the authentication process is completed successfully. Thereafter, the UMA device can access voice and data services available through the cellular network.

Authentication in a conventional UMA system is conducted using an IKEv2 w/EAP-SIM (Internet Key Exchange) protocol and results in the formation of a single IPSec (IP Security) tunnel between a mobile station and a serving UNC. As part of the IKE process, a UNC may authenticate itself to the mobile station using a public certificate signed by a trusted party. The mobile station, in turn, authenticates itself to the cellular network and to the UNC using credentials stored in its subscriber identification module (SIM). The two sides negotiate encryption methods and exchange keying material which is used to derive cryptographic keys. The cryptographic keys are then used for origin authentication and to encrypt communications for transport through the IPSec tunnel.

A LAN-UNC may participate in the authentication process in several ways. In some embodiments, the LAN-UNC is disposed as part of the IPSec tunnel connecting the mobile station to the serving UNC. In such embodiments, the LAN-UNC functions as a seamless part of the IPSec tunnel and transparently intercepts packets as they travel through the tunnel. In other embodiments, the LAN-UNC may proxy a connection between the mobile station and the serving UNC. In this arrangement, the LAN-UNC forms two IPSec tunnels—a first IPSec tunnel within the local area network, and a second IPSec tunnel extending over an external network—to carry communication between the mobile station and the serving UNC. In yet another embodiment, the LAN-UNC may form separate IPSec tunnels for each UMA device on the local area network, but utilize a single secure channel over the external network to carry packets for most (or all) of the individual UMA devices. These embodiments are described in greater detail below.

A. Seamless Connection

Figure 4:
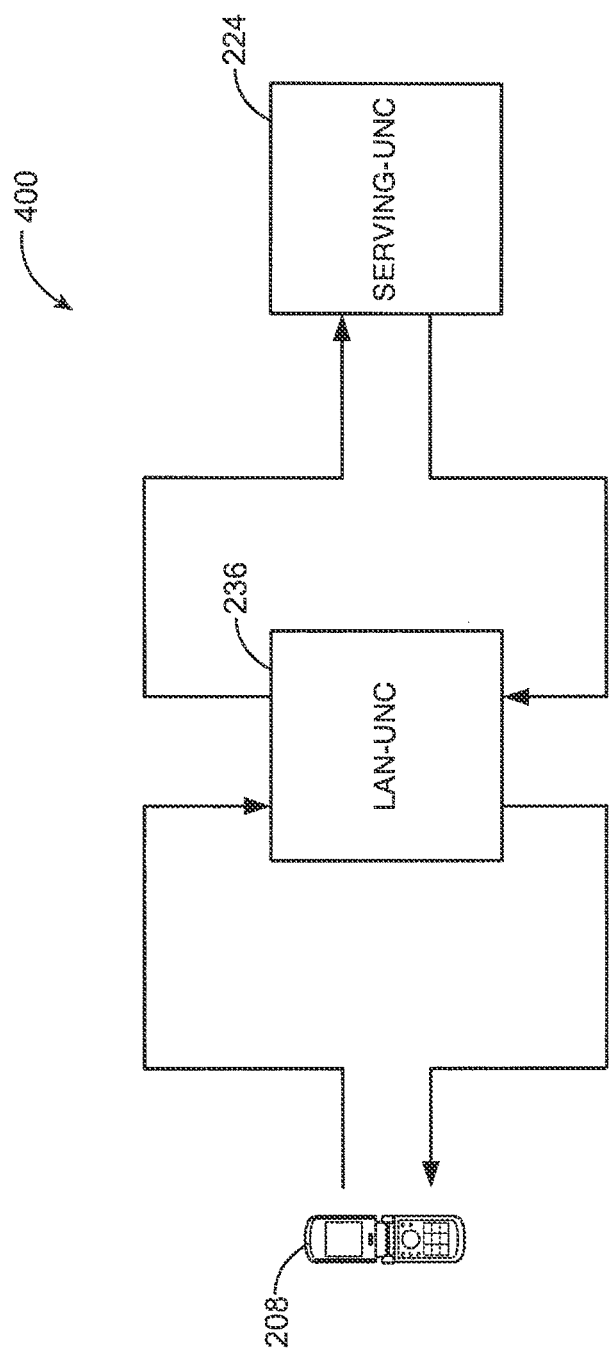
FIG. 4 is a conceptual view of a LAN-UNC disposed within a secure communication channel.

FIG. 4 is a conceptual view 400 of a LAN-UNC disposed within an IPSec tunnel according to an embodiment of the present invention. In this embodiment, the IPSec tunnel connects mobile station 208 with serving UNC 224 and is represented by arrows pointing in both directions. LAN-UNC 236 does not terminate the tunnel but instead intercepts packets as they pass through the tunnel. In one direction, the tunnel carries packets from mobile station 208 to serving UNC 224. As shown, LAN-UNC 236 intercepts the packets before they reach serving UNC 224. In the other direction, LAN-UNC intercepts packets carried from serving UNC 224 to mobile station 208. LAN-UNC 236 may decrypt and process the packets as needed. LAN-UNC 236 may encrypt the processed packets and place them back into the tunnel for transport. Alternatively, LAN-UNC 236 may add or remove packets from the tunnel entirely. The process of intercepting, decrypting, and processing packets is transparent to both mobile station 208 and serving UNC 224 and is performed in both directions.

Figure 5:
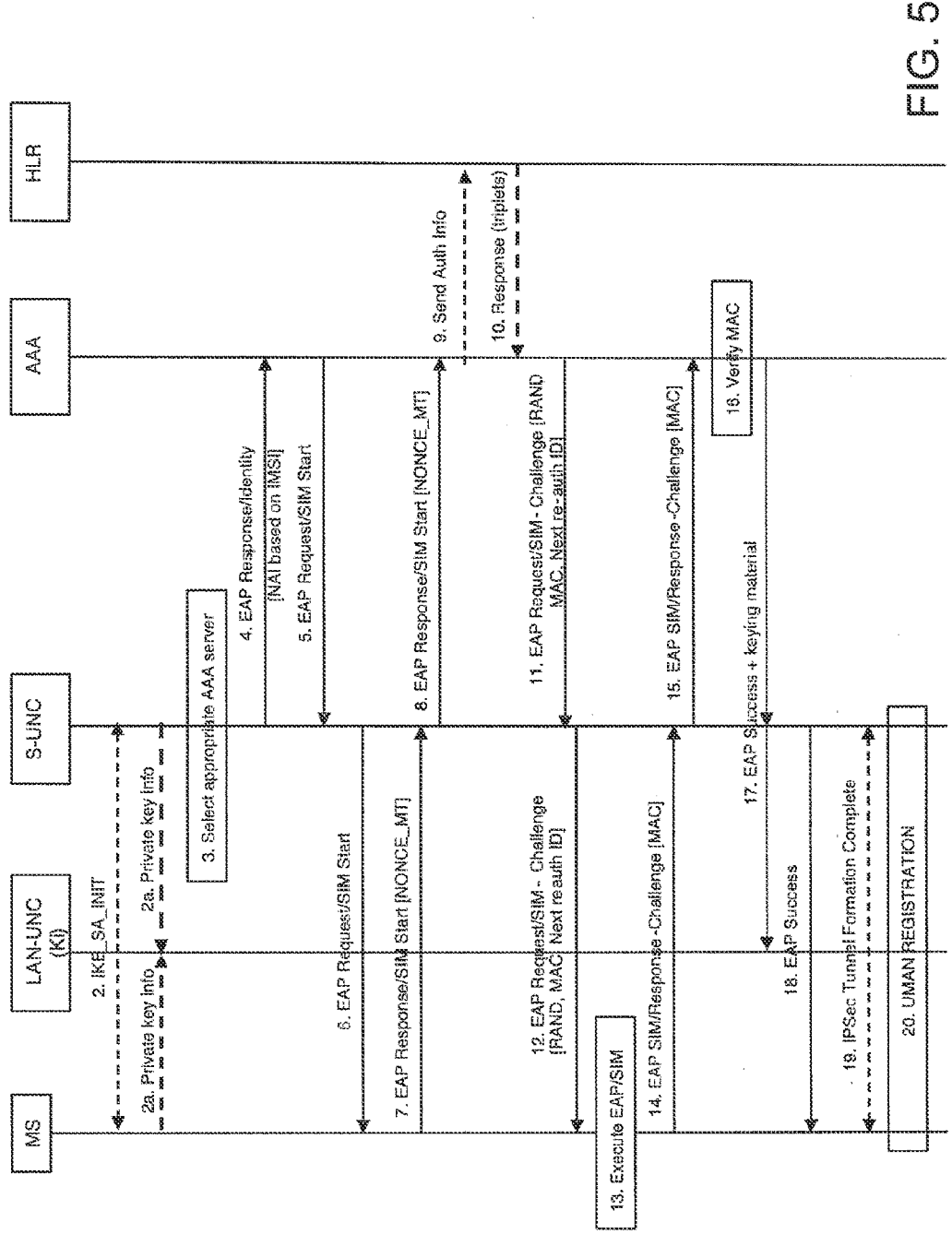
FIG. 5 shows parts of an authentication process conducted according to an embodiment of the present invention.

FIG. 5 shows parts of an authentication process conducted according to an embodiment of the present invention. As shown, LAN-UNC monitors an IKE process that results in the formation of an IPSec tunnel between mobile station (MS) and serving UNC (S-UNC). As a part of this process, LAN-UNC confirms that mobile station MS has been properly authenticated by the core cellular network and obtains the cryptographic keys needed to access packets exchanged over the IPSec tunnel. Arrows are shown as representing exchanges between the various entities participating in the IKE process. Also, short text descriptions are attached to each arrow. It will be understood that these arrows and text descriptions are intended to broadly illustrate the authentication process and that some exchanges and exchange parameters have been omitted for clarity.

In a first exchange, MS initiates an IKE security association with S-UNC. This exchange may involve multiple packets and is represented by IKE_SA_INIT. As part of the exchange, for example, MS and S-UNC may negotiate encryption algorithms and generate initial cryptographic keys. These keys are used to protect the IKE exchange and to encrypt data in the resulting IPsec tunnel. In some embodiments, LAN-UNC receives private keying material for use in decrypting communications between MS and S-UNC. For example, S-UNC may cooperate with LAN-UNC by providing the shared secret used to generate Diffie-Hellman session keys. Alternatively, MS may provide the necessary keying information.

Using a combination of public and private keying material, LAN-UNC monitors subsequent exchanges between MS and S-UNC.

As part of the IKE security association, MS may require S-UNC to authenticate its identity. In some cases, S-UNC authenticates its identity by encrypting data with a public certificate that has been signed by a trusted authority. If MS accepts these credentials, an EAP-SIM (Extensible Authentication Protocol/SIM implementation) exchange begins through which MS is authenticated to the cellular network.

Authentication with the cellular network is based upon a cellular shared secret (Ki) that is known to both MS and the cellular provider. A copy of the Ki may be stored in a Home Location Registry (HLR) located within the core cellular network. In some embodiments, LAN-UNC also stores a copy of the Ki and uses it to monitor or participate in the exchange of EAP-SIM messages. Mutual authentication for the IKE process is complete when MS successfully proves its identity to the core cellular network and this results in the formation of an IPSec tunnel between MS and S-UNC. Keying material produced as part of the IKE/EAP-SIM process is used by S-UNC to encrypt data for transport through the IPSec tunnel.

IKE_SA_INIT starts the EAP-SIM exchange. In a first part of the EAP-SIM exchange, S-UNC locates a secure (AAA) server through which it can access data stored within the core cellular network. AAA server implements a protocol such as RADIUS (Remote Authentication Dial-In Service) to communicate securely with S-UNC. In some embodiments, a RADIUS client in S-UNC sends IMSI information for MS to the AAA server. This exchange is represented by an EAP Response/Identity message in which the IMSI is conveyed as part of an NAI (network address identifier). Next, AAA server generates an EAP Request/SIM-Start message to acknowledge that the EAP-SIM process has been initiated. S-UNC sends the EAP Request/SIM-Start message to MS. LAN-UNC intercepts the EAP Request/SIM-Start message before it reaches MS and prepares to monitor the authentication process. LAN-UNC may store a copy of the intercepted message as it travels to MS. This copying operation may be performed for all intercepted packets without delaying transmission.

MS may respond to the EAP Request/SIM-Start message by generating an EAP Response/SIM-Start message which includes a NONCE_MT parameter. NONCE_MT represents a random number chosen by MS to be used as part of the authentication process. LAN-UNC receives the EAP Response/SIM-Start message and directs it to S-UNC. LAN-UNC may record the value of NONCE_MT for later use. S-UNC relays the EAP Response/SIM-Start message and NONCE_MT parameter to AAA server. AAA server sends NONCE_MT to the core cellular network. In some configurations, AAA server is disposed within an Authentication Centre (AuC). AuC accesses information from the core cellular network using the IMSI of MS. Using this information, AuC generates one or more cellular triplets with which to verify the identity of MS.

As those of skill in the art will recognize, cellular triplets are generally expressed as a group comprising (RAND, SRES, $K_C$). RAND represents a random number generated by the AuC upon which calculations are performed to verify a subscriber's identity. SRES is a signed response value produced by a proprietary GSM authentication algorithm using the values of RAND and shared secret Ki. $K_C$ is a cryptographic key derived from the Ki and RAND according to another proprietary GSM authentication algorithm. Thus, it will be apparent that cellular triplets can be calculated if the GSM authentication algorithms and shared secret Ki are known. In addition, possessing the full set of cellular triplets enables keying material and authentication codes to be derived.

Using the cellular triplets, AAA server generates an EAP Request/SIM-Challenge message that may include various parameters. As shown, the challenge message includes RAND, MAC, and Re-Auth ID parameters. RAND represents the random number generated by the AuC and is part of the cellular triplet. MAC is a general message authentication code that is used to protect the challenge. Re-Auth ID may be used as part of a subsequent re-authorization procedure. S-UNC receives the EAP Request/SIM-Challenge message and forwards it to MS. LAN-UNC may intercept the message and record elements of the challenge such as the RAND and MAC. LAN-UNC may use these parameters to monitor the state of authentication process in subsequent exchanges. In some embodiments, the cellular shared secret Ki and GSM authentication algorithms are supplied by a cellular provider and used by LAN-UNC is to monitor the authentication process and to access derived keying material.

As shown, LAN-UNC communicates the EAP Request/SIM-Challenge message to MS. On receipt of the EAP Request/SIM-Challenge message, MS may run the GSM authentication algorithm and calculate a copy of the message authentication code. If the MAC calculated by MS matches the MAC received as a parameter of the SIM-challenge message, MS is assured that S-UNC has access to valid cellular triplets. MS may respond to the RAND challenge by generating a local SRES value. As shown, MS calculates a message authentication code based upon the local SRES value and sends it to S-UNC as an EAP SIM/Response-Challenge message. LAN-UNC intercepts the Response-Challenge message and, in some embodiments, verifies the new MAC using its copy of the Ki. In this way, LAN-UNC can independently authenticate MS and can take appropriate action if authentication is not successful.

LAN-UNC forwards the EAP SIM/Response-Challenge message to S-UNC. S-UNC, in turn, forwards the message to AAA server in RADIUS. AAA server attempts to verify the MAC calculated by MS. If the MAC is correct, AAA server may send an EAP Success message to S-UNC. In some cases, this message may be accompanied by derived keying material for use in completing the IKE negotiation between S-UNC and MS. S-UNC sends the EAP Success message to MS. LAN-UNC may intercept the message and verify that MS authenticated successfully with AAA server. LAN-UNC may also record keying material received from S-UNC before forwarding the EAP Success message to MS. In some embodiments, S-UNC cooperates to provide keying material outside of the EAP-SIM process.

At this point, MS has authenticated with the cellular network and IKE mutual authentication is complete. As a last part of the IKE process, an IPSec security association is created between MS and S-UNC. The IPSec security association completes tunnel formation and a registration process can commence. Keys generated during the IKE process are used to encrypt packets exchanged between MS and S-UNC. By participating in the process, LAN-UNC has acquired all keying material necessary to encrypt and decrypt tunnel traffic and has full access to packets sent between the two devices.

LAN-UNC may not always have possession of the Ki value for each MS connected to the local area network. In many cases, Ki values are closely guarded by cellular providers and their distribution and storage outside of the core cellular network may not be possible. In such cases, LAN-UNC may be adapted to receive cellular triplets from a serving UNC or other suitable device over the external network. Using the appropriate cellular triplet information, LAN-UNC participates fully in the IKE/EAP-SIM process and becomes a seamless as part of the resulting IPSec tunnel.

Figure 6:
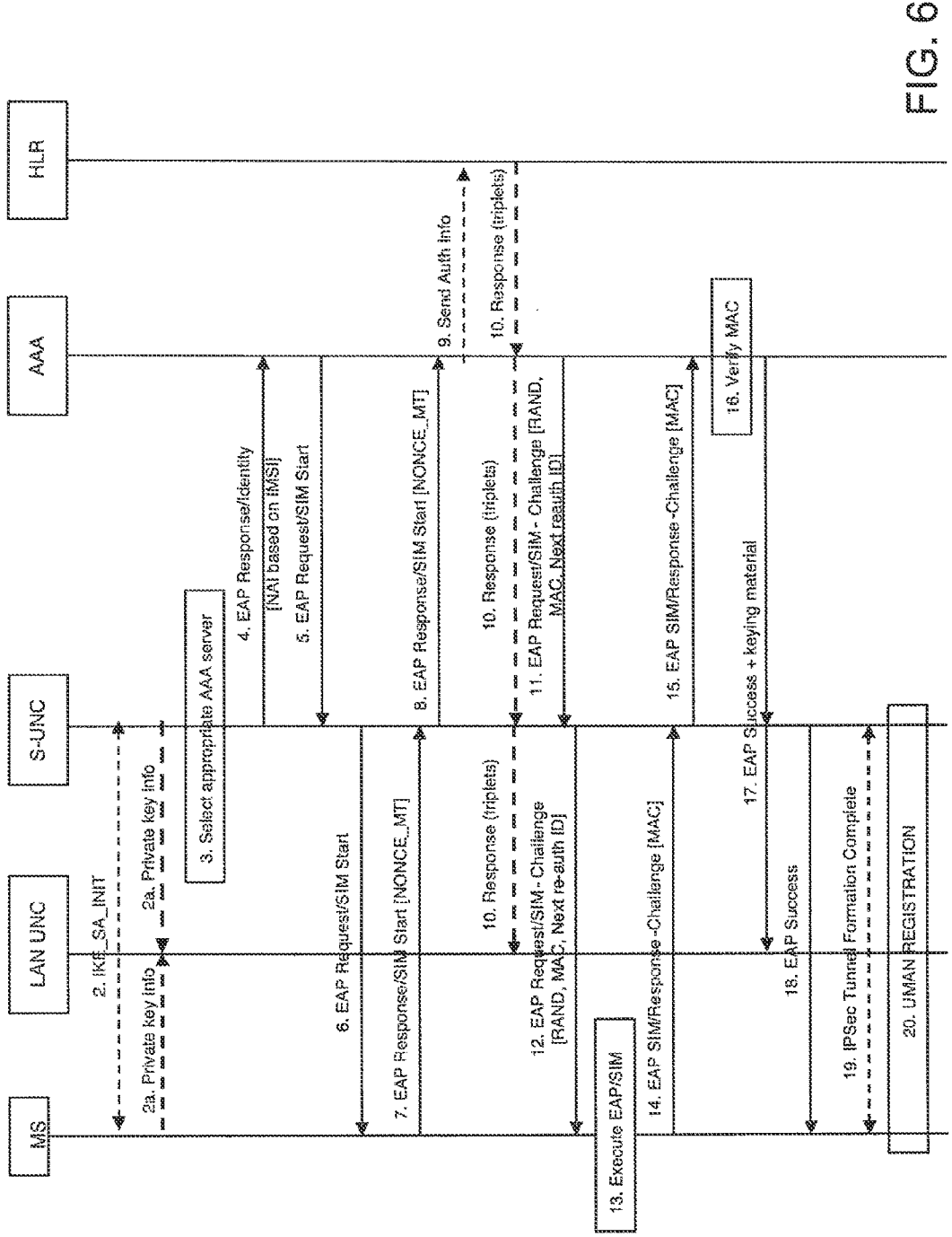
FIG. 6 shows parts of an authentication process conducted according to another embodiment of the present invention.

FIG. 6 shows parts of an authentication process conducted according to another embodiment of the present invention. In this embodiment, LAN-UNC receives IKE private key information, monitors the IKE process, and detects initiation of EAP-SIM authentication. AAA server receives an EAP Response/SIM Start message and requests cellular triplets from HLR. AAA server then delivers the cellular triplets to S-UNC. S-UNC, in turn, cooperates to deliver the cellular triplets to LAN-UNC. With possession of the triplets, LAN-UNC monitors and participates in the authentication process as previously described.

Figure 7:
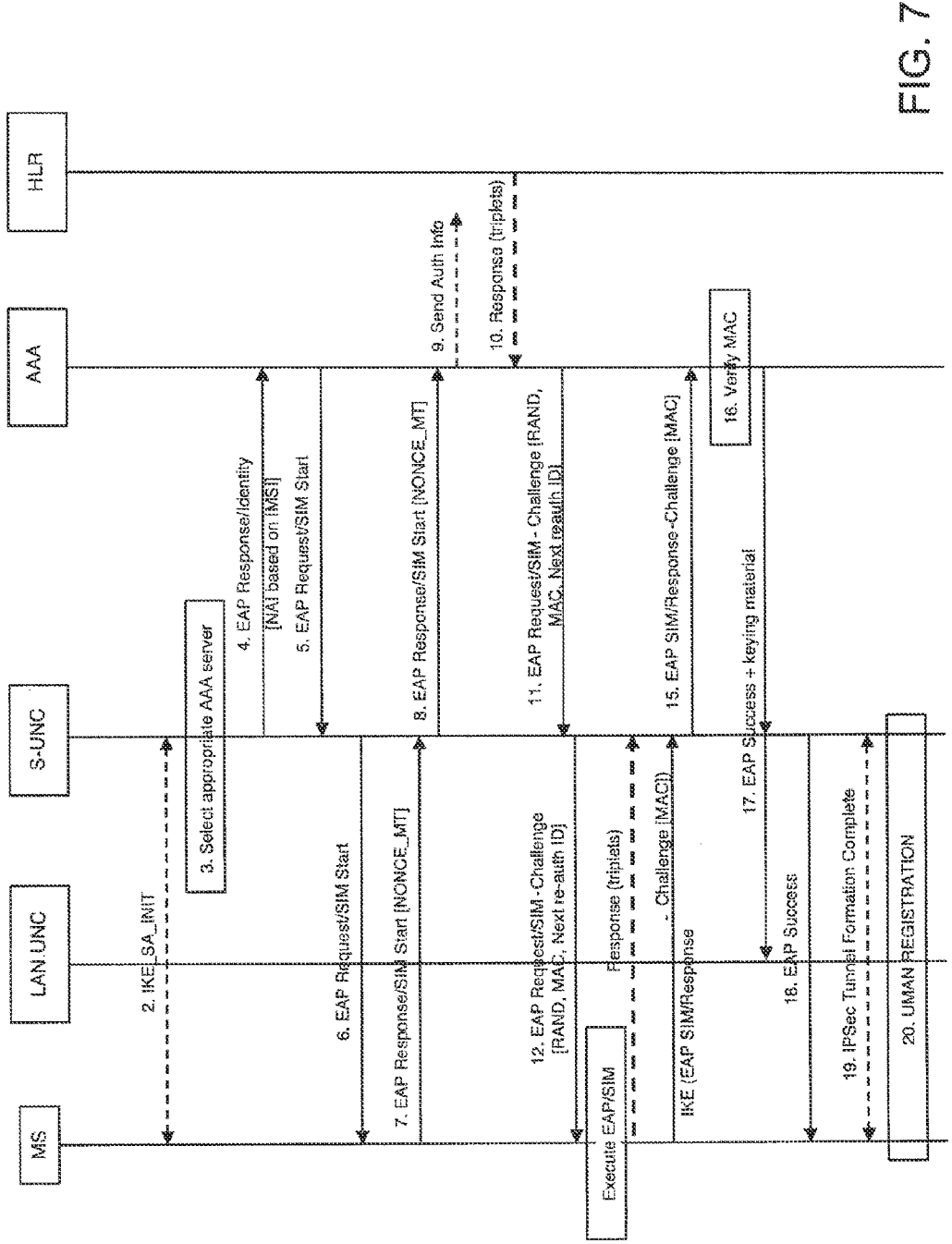
FIG. 7 shows exchanges forming part of an authentication process conducted according to a further embodiment of the present invention.

FIG. 7 shows exchanges forming part of an authentication process according to a further embodiment of the present invention. In this embodiment, LAN-UNC is adapted to receive cellular triplets from a mobile station. This provides additional flexibility in performing the authentication process. For example, LAN-UNC may maintain a list of trusted mobile stations. During the IKE process, the IMSI of a mobile station may be compared to the list of trusted mobile stations. Mobile stations on the list may be specially configured to deliver cellular triplets to LAN-UNC at an appropriate time during the authentication process. Thus, LAN-UNC may permit a trusted mobile station to initiate authentication while blocking untrusted mobile stations.

As shown, mobile station MS generates triplets locally in response to receiving the EAP Request/SIM-Challenge message. In one embodiment, MS cooperates to transfer its locally generated triplets to LAN-UNC. This transfer may occur as one or more messages exchanged between the devices. In some embodiments, MS provides locally generated triples to LAN-UNC over a secure communication path that is maintained separately from the IKE process. Using triplets received from MS, LAN-UNC monitors and participates in the authentication process as previously described.

B. Proxy Connection

Figure 8:
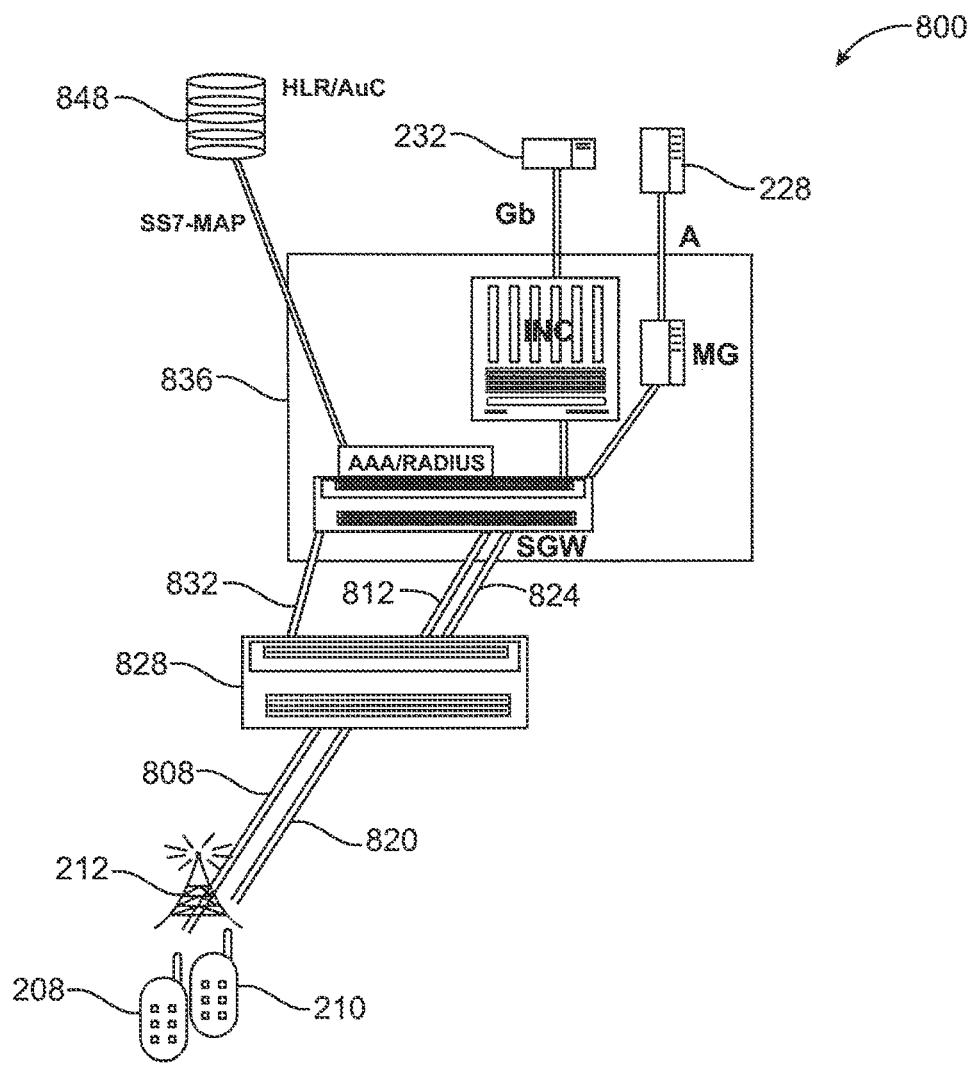
FIG. 8 is a simplified block diagram of a LAN-UNC interacting with elements of a UMA communication system according to an embodiment of the present invention.

FIG. 8 is a simplified block diagram of a LAN-UNC 828 interacting with various elements of a UMA communication system according to an embodiment of the present invention. Serving UNC 836 is shown as including a RADIUS client, an IP network controller (INC), a security gateway (SGW), and a media gateway (MG). SGW terminates incoming tunnels and protects the carrier network. INC provides a Gb interface to connect serving UNC 836 to SGSN 228. Similarly, MG provides an A interface to connect serving UNC 836 to MSC 232. INC, SGW, and MG may be separate components or, in some cases, their functions may be integrated in a single unit. In addition, INC and MG may separately addressable within the core cellular network.

Serving UNC 836 is also shown as connected to HLR/AuC 848 by an SS7-MAP (Signaling System #7-Mobile Application Part) connection. Using the SS7-MAP connection, serving UNC 836 can access HLR/AuC and obtain cryptographic keys and other information for a particular communication session. An IPSec control tunnel 832 extending between serving UNC 836 and LAN-UNC 828 enables the cryptographic keys and other information to be securely transferred between devices.

In this embodiment, LAN-UNC 828 is configured to proxy a connection to serving UNC 836 on behalf of mobile stations 208, 210. As proxy, LAN-UNC 828 receives incoming packets from mobile stations 208, 210 and creates new packets for transmission to serving UNC 836. Rather than intercepting packets as they pass through a single IPSec tunnel, two IPSec tunnels are formed per UMA device. A first IPSec tunnel extends from a mobile station to LAN-UNC 828. The first IPSec tunnel runs completely within the local area network and is terminated at LAN-UNC 828. A second IPSec tunnel extends from LAN-UNC 828 to serving UNC 836. The second IPSec tunnel runs over the external network and is terminated at serving UNC 836.

Mobile stations 208, 210 are connected to a local area network (not shown) by wireless access point 212. IPSec tunnel 808 carries packets from first mobile station 208 to LAN-UNC 828 over the local area network. IPSec tunnel 812 carries first mobile station 208 packets from LAN-UNC 828 to serving UNC 836. In like manner, IPSec tunnel 820 carries packets from second mobile station 210 to LAN-UNC 828 and IPSec tunnel 824 carries second mobile station 210 packets from LAN-UNC 828 to serving UNC 836. In a typical configuration, these tunnels are formed as part of the process by which a UMA device authenticates with the cellular network. This process is described in greater detail with reference to the following figures.

Figure 9:
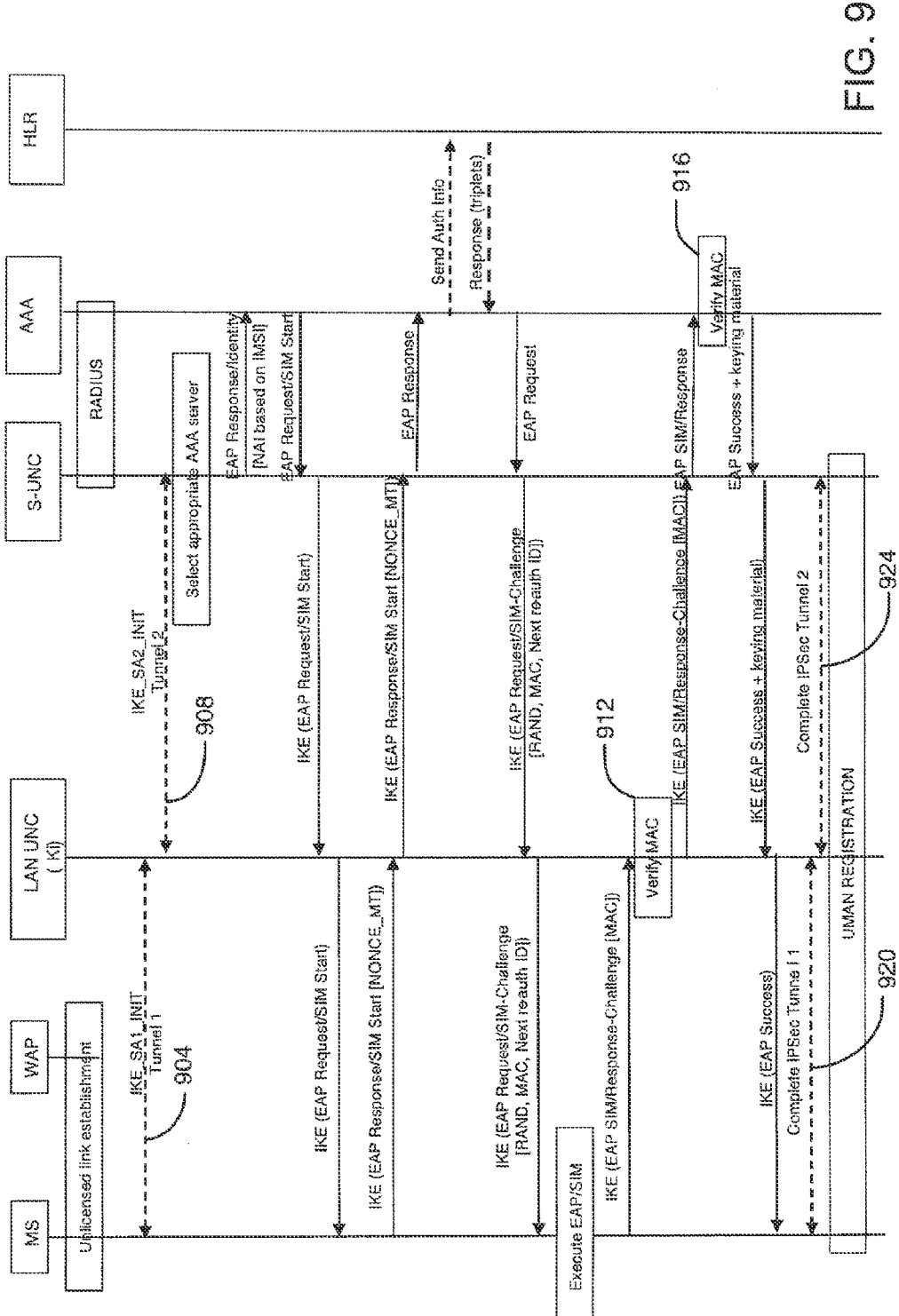
FIG. 9 shows parts of an authentication process conducted according to an embodiment of the present invention.

FIG. 9 shows parts of an authentication process conducted according to an embodiment of the present invention. As shown, LAN-UNC proxies a connection between a mobile station (MS) and a serving UNC (S-UNC) by creating two IPSec tunnels to carry packets between the devices. In the authentication process, LAN-UNC impersonates both sides of the exchange. Thus, LAN-UNC interacts with MS as if it was a serving UNC. Similarly, LAN-UNC interacts with S-UNC as if it was an ordinary UMA device. In some embodiments, LAN-UNC is preconfigured with appropriate authentication material for this purpose. For example, LAN-UNC may store one or more public certificates for use in authenticating itself as a UMA network controller to MS.

Authentication is performed as part of an IKE process with EAP-SIM as previously described. As shown, a first IKE security association (IKE_SA1) is formed between MS and LAN-UNC and a second IKE security association (IKE_SA2) is formed between LAN-UNC and S-UNC. The formation of the first security association is represented by dashed arrow 904 and labeled IKE_SA1_INIT. The formation of the second security association is represented by dashed arrow 908 and labeled IKE_SA2_INIT. The dashed arrows may signify the exchange of several messages. IKE_SA1 and IKE_SA2 may or may not contain matching parameters. For example, in a typical configuration, a same encryption method may be specified as part of each security association but the encryption keys may be different. LAN-UNC may utilize pre-loaded public certificates during formation of IKE_SA1 in order to authenticate itself to MS as a trusted UMA network controller. Similarly, LAN-UNC may offer the IMSI of MS to S-UNC during formation of IKE_SA2.

After the IKE security associations are formed, MS authenticates itself through the EAP-SIM challenge-response mechanism previously described. In some embodiments, LAN-UNC possesses the cellular shared secret Ki. A separate Ki may be pre-loaded into LAN-UNC for each authorized UMA device. Alternatively, LAN-UNC may request the Ki from S-UNC through a separate control channel.

Using the cellular shared secret Ki, LAN-UNC can complete the formation of both IPSec tunnels. LAN-UNC authenticates MS by verifying its response to the RAND challenge. MS generates an EAP SIM/Response-Challenge message including the MAC it calculates. As shown in box 912, LAN-UNC verifies the received MAC using the cellular shared secret Ki. Upon successful verification of the MAC, MS is authenticated to LAN-UNC. LAN-UNC completes authentication with the cellular network by generating its own EAP SIM/Response-Challenge message containing the message authentication code. LAN-UNC forwards this message to S-UNC and, as shown in box 916, it is subsequently verified by a AAA server. If AAA server successfully verifies the MAC, is authenticated to the cellular network. At this point, mutual authentication for both IKE exchanges is complete and two IPSec tunnels are formed. The first IPSec tunnel 920 extends between MS and LAN-UNC over the local area network. The second IPSec tunnel 924 extends between LAN-UNC and S-UNC over the external network. When first IPSec tunnel 920 and second IPSec tunnel 924 are complete, LAN-UNC functions as a man-in-the-middle for all packets exchanged between MS and S-UNC.

Figure 10:
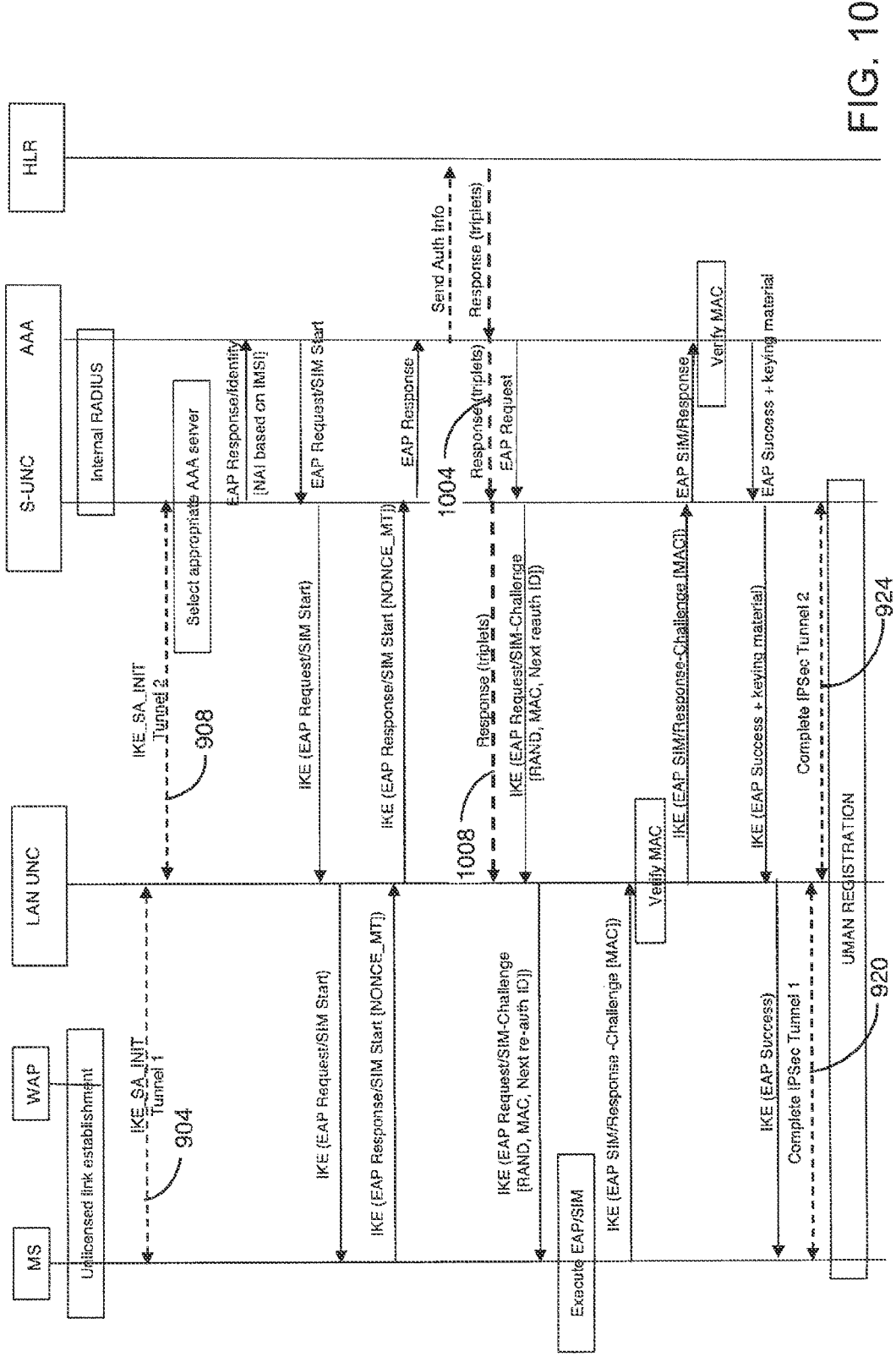
FIG. 10 shows exchanges forming part of an authentication process according to an embodiment of the present invention.

FIG. 10 shows exchanges forming part of an authentication process according to an embodiment of the present invention. In this embodiment, a serving UNC (S-UNC) delivers triplets to LAN-UNC as part of the authentication process. S-UNC includes an internal RADIUS function/AAA server which processes the EAP negotiation and communicates directly with HLR. In response to sending authentication data, S-UNC receives triplets from HLR as shown by dashed arrow 1004. S-UNC then sends the triplets to LAN-UNC. This is represented by dashed arrow 1008. After receiving triplets from S-UNC, LAN-UNC completes the authentication process resulting in formation of the first IPSec tunnel 920 and second IPSec tunnel 924 as previously described.

Figure 11:
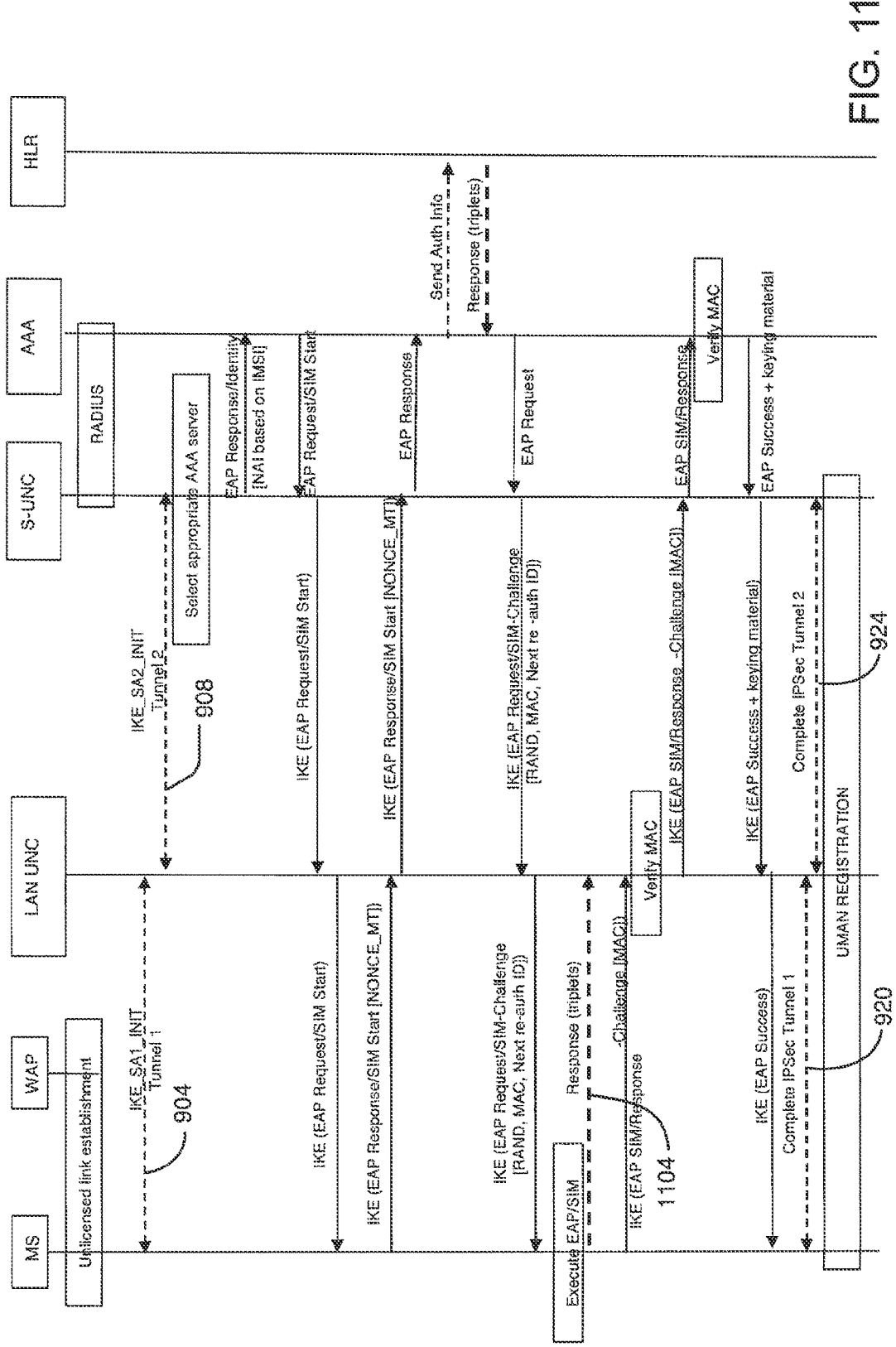
FIG. 11 shows parts of an authentication process conducted in accordance with an embodiment of the present invention.

FIG. 11 shows parts of an authentication process conducted in accordance with an embodiment of the present invention. In this embodiment, a mobile station MS delivers triplets to LAN-UNC as part of the authentication process. For example, MS may include a UMA client adapted to deliver triplets to LAN-UNC as represented by dashed arrow 1104. After receiving triplets from MS, LAN-UNC completes the authentication process resulting in formation of the first IPSec tunnel 920 and second IPSec tunnel 924 as previously described.

C. Tunneled Connection

Figure 12:
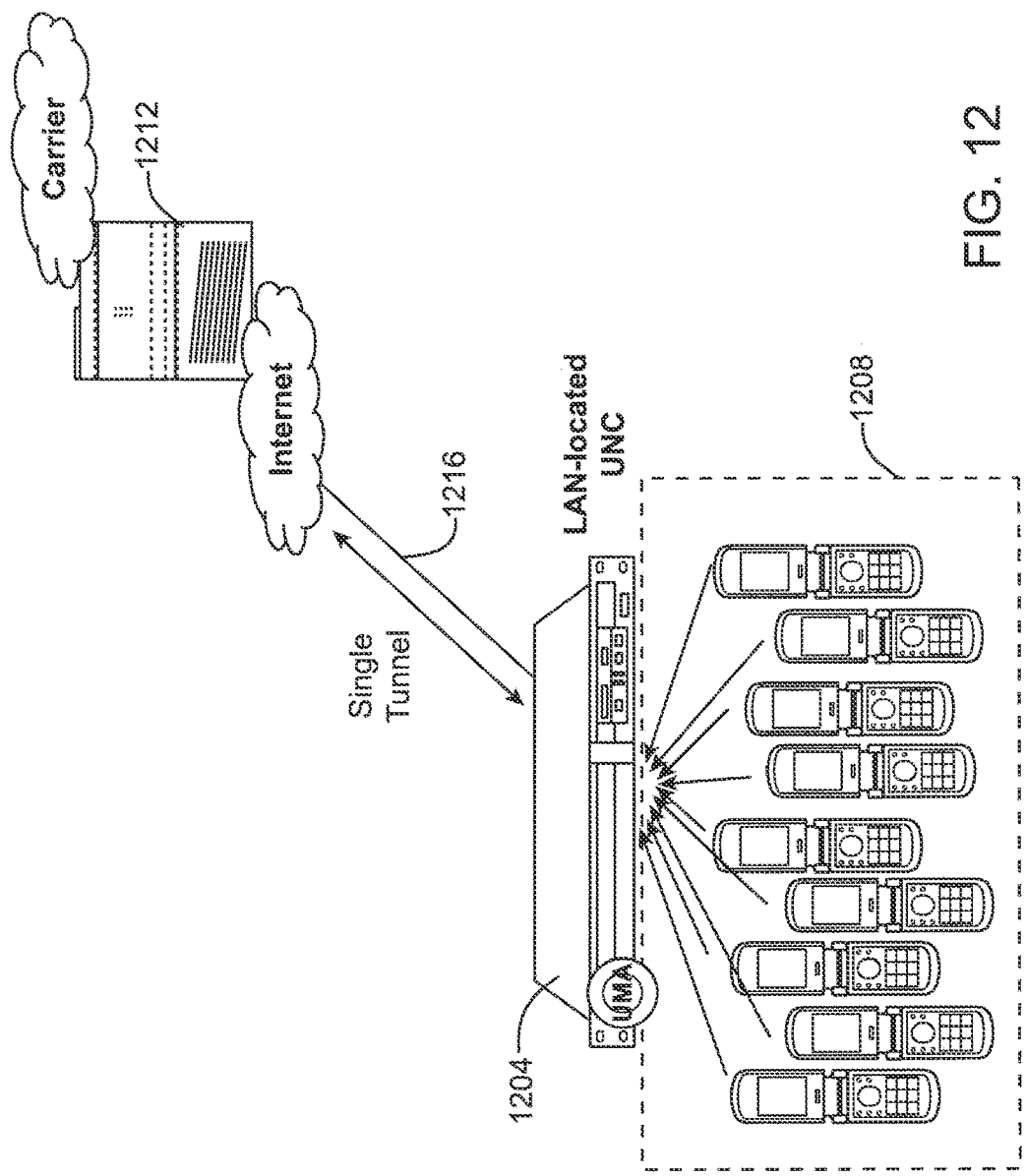
FIG. 12 is a simplified block diagram of a LAN-UNC operating as part of UMA communication system according to an embodiment of the present invention.

FIG. 12 is a simplified block diagram of a LAN-UNC operating as part of UMA communication system according to an embodiment of the present invention. In this embodiment, a plurality of UMA devices 1208 exchange packets with LAN-UNC 1204 over the local area network. As shown, each UMA device in the plurality of UMA devices 1208 communicates with LAN-UNC 1104 through a separate IPSec tunnel LAN-UNC 1204 receives packets from the separate IPSec tunnels and transports them through a transport tunnel 1216 to a serving UNC 1212. Transport tunnel 1216 may be an IPSec tunnel, a GRE (Generic Routing Encapsulation) tunnel, or other standard network transport mechanism.

In some embodiments, data from the plurality of UMA devices 1208 is multiplexed and a stream of multiplexed packets are sent through transport tunnel 1216 to serving UNC 1212. Serving UNC 1212 terminates the tunnel, demultiplexes the packets, and directs them to their destinations within the core cellular network. This embodiment uses network resources efficiently and reduces processing requirements. For example, processing overhead associated with maintaining separate IPSec tunnels over the external network is eliminated. Transport tunnel 1216 may be an IPSec tunnel or some other form of network transport. Additionally, with cooperation between the LAN-UNC 1204 and serving UNC 1212, audio and data may be compressed, or otherwise optimized, in order to increase bandwidth efficiency. Voice optimization schemes suitable for this purpose are well-known to those of ordinary skill in the art.

Figure 13:
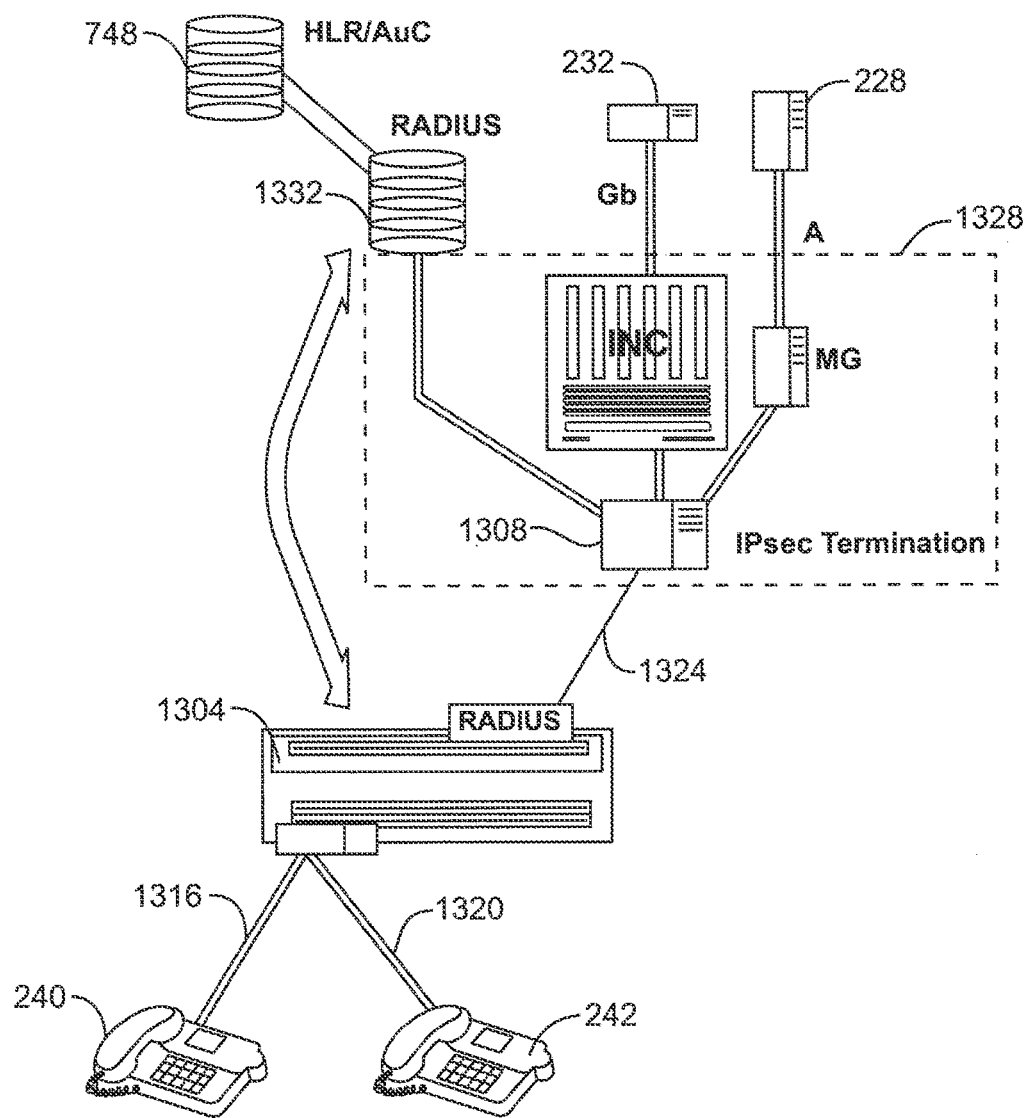
FIG. 13 is a simplified block diagram of a LAN-UNC interacting with elements of a UMA communication system according to an embodiment of the present invention.

FIG. 13 is a simplified block diagram of a LAN-UNC interacting with various elements of a UMA communication system according to an embodiment of the present invention. As shown, UMA phones 240, 242 are connected to LAN-UNC 1304 by separate IPSec tunnels 1316, 1320. A single IPSec transport tunnel 1324 connects LAN-UNC 1304 to serving UNC 1328. In this embodiment, LAN-UNC 1304 includes a RADIUS client for obtaining authentication data from a RADIUS server 1332 located within the core cellular network. Communication between LAN-UNC 1304 and RADIUS server 1332 may be carried by IPSec transport tunnel. In some embodiments, IPsec termination block 1308 includes a RADIUS Relay agent to facilitate communications between the LAN-UNC 1304 and RADIUS server 1332.

Serving UNC 1328 is shown as including an IPSec termination block 1308. In some configurations, IPSec termination block 1308 terminates IPSec transport tunnel 1324 and replaces the security gateway function SGW of conventional UMA network controllers. IPSec termination block 1308 decrypts packets carried by IPSec transport tunnel 1324 and transports the decrypted packets to their final destinations within the carrier network. For example, IPSec termination block may be connected to RADIUS server, IP network controller (INC), and media gateway (MG). Using inside addressing information from the tunneled packets, IPSec termination block 1308 directs the packets to their destinations within the core cellular network. In some embodiments, LAN-UNC 1304 and IPSec termination block 1308 cooperate to modify the security associations of IPSec transport tunnel 1324. In this way, a list of addresses may be maintained and used to control access to IPSec transport tunnel 1324. IPSec termination block 1308 may also demultiplex, decompress, and perform additional processing of optimized packets as required.

Figure 14:
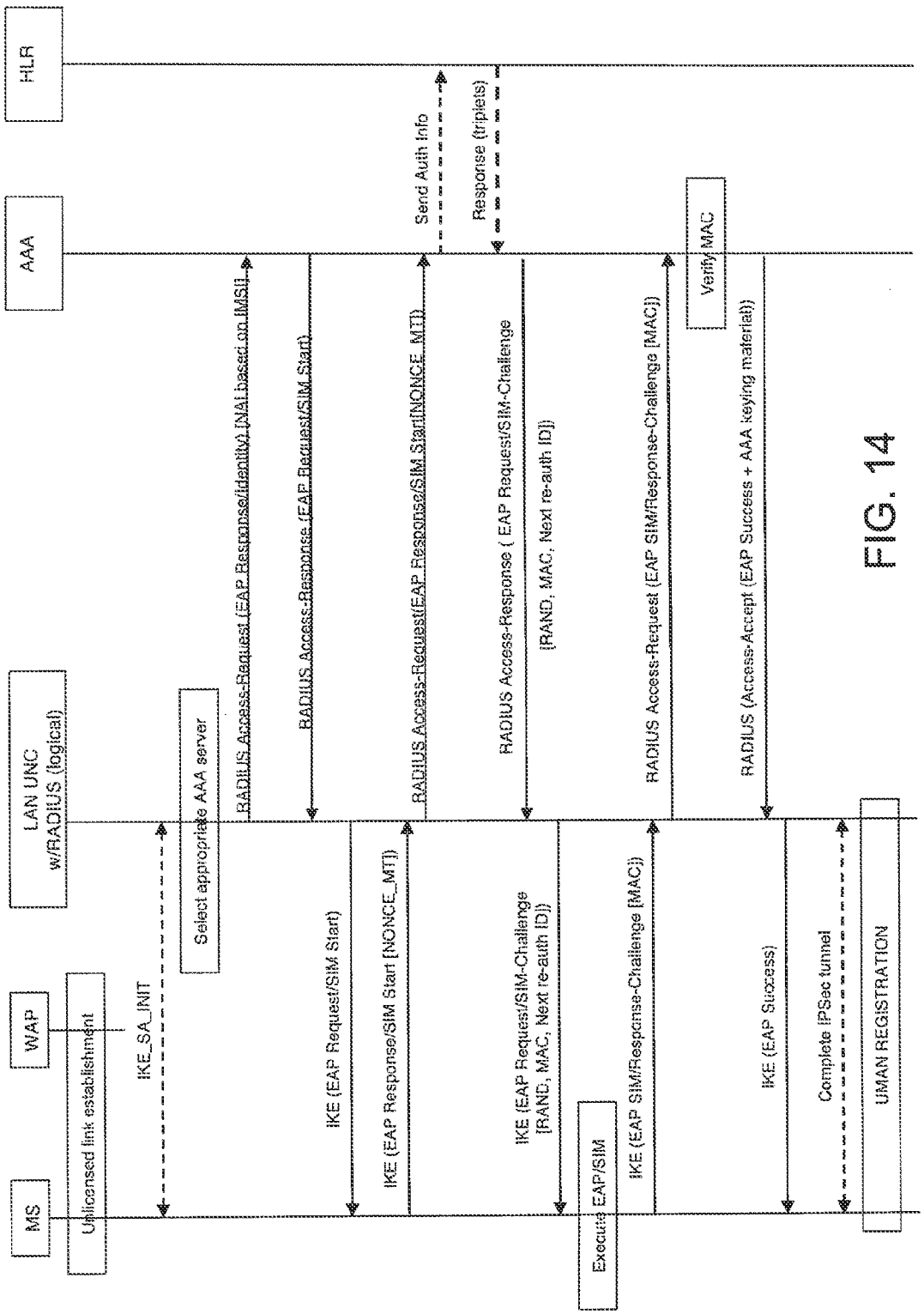
FIG. 14 shows portions of an authentication process conducted according to one embodiment of the present invention.

FIG. 14 shows parts of an authentication process conducted according to one embodiment of the present invention. In this embodiment, LAN-UNC includes a RADIUS client that interacts directly with a AAA server in the core cellular network. Using the RADIUS client, LAN-UNC completes authentication and IPSec tunnel formation for mobile station MS. The authentication process includes an IKE exchange and EAP-SIM challenge mechanism as previously described. As shown, the first IPSec tunnel connecting MS to LAN-UNC over the local area network is formed. Communication between LAN-UNC and serving-UNC (not shown) is carried by a single IPSec transport tunnel as previously described.

Figure 15:
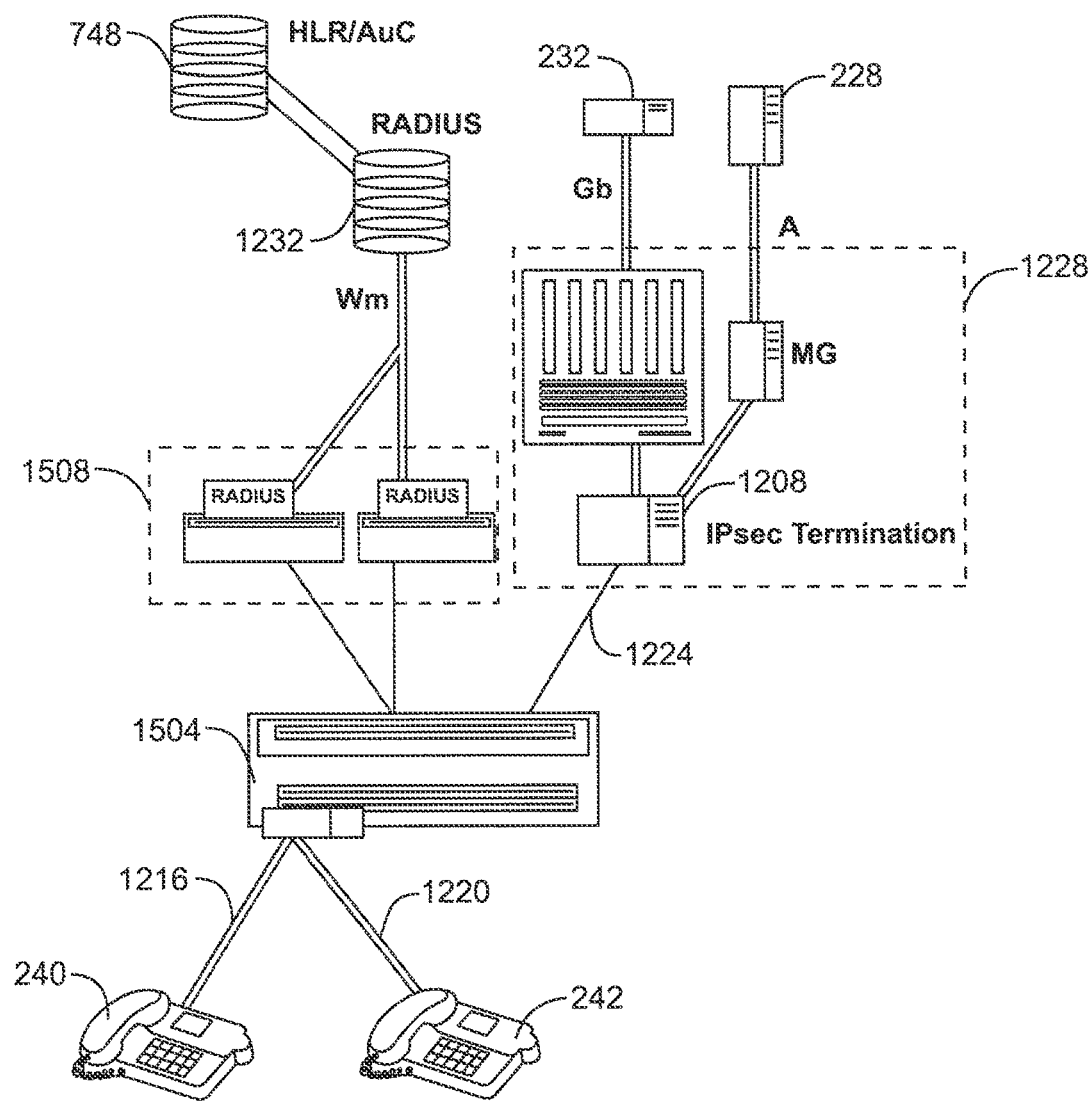
FIG. 15 is a simplified block diagram of a LAN-UNC operating as part of a UMA communication system according to an embodiment of the present invention.

FIG. 15 is a simplified block diagram of a LAN-UNC operating as part of a UMA communication system according to an embodiment of the present invention. In this embodiment, LAN-UNC 1504 communicates with remote RADIUS client 1508 to obtain authentication data from RADIUS Server 1232. As shown, a redundant connection is provided between LAN-UNC 1504 and remote RADIUS client 1508. Remote RADIUS client 1508 communicates LAN-UNC requests to RADIUS server 1232. RADIUS server 1232 maintains a connection to HLR/AuC 748. This arrangement permits LAN-UNC 1504 to request and receive authentication data needed to participate in the authentication process.

Figure 16:
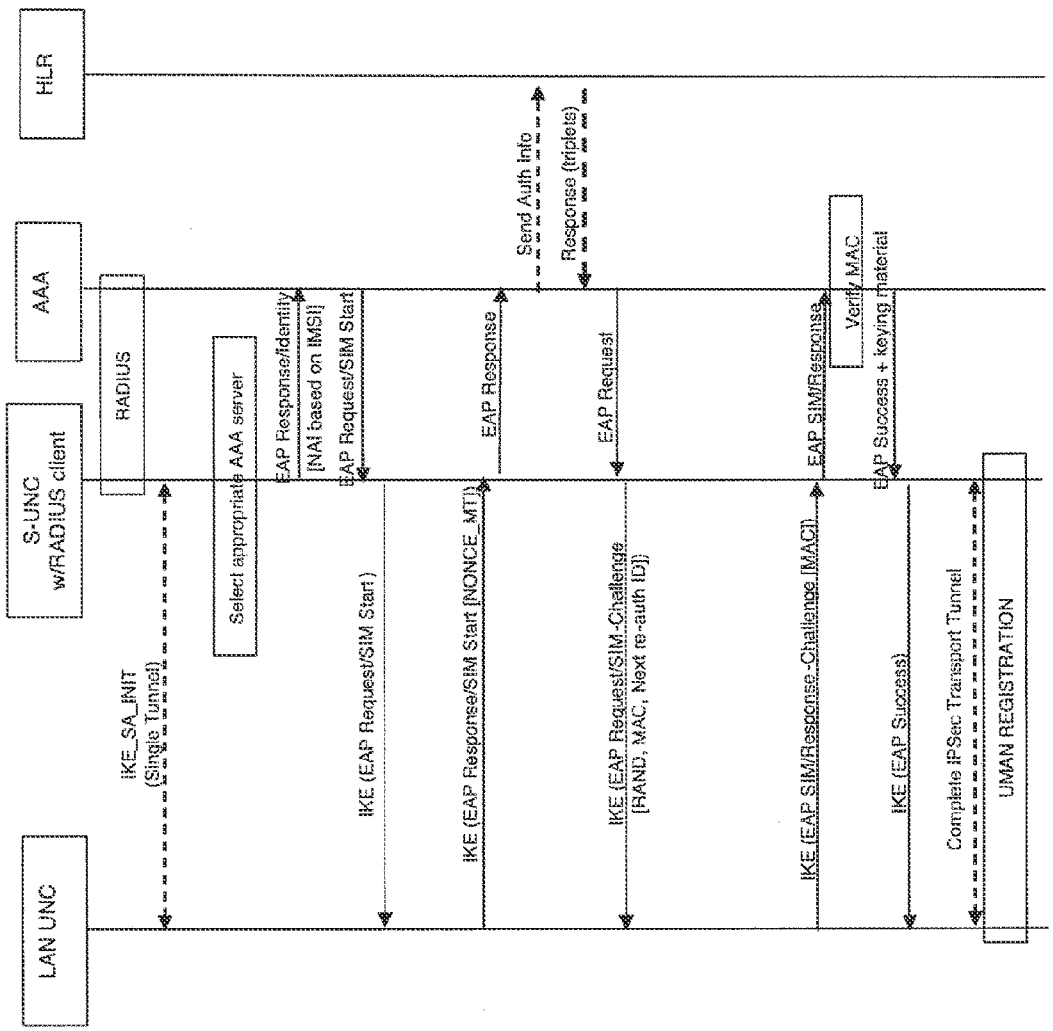
FIG. 16 shows exchanges forming part of an authentication process conducted according to an embodiment of the present invention.

FIG. 16 shows formation of an IPSec transport tunnel according to one embodiment of the present invention. In this embodiment, LAN-UNC communicates with a RADIUS client located within a serving UNC (S-UNC) and initiates an IKE/EAP-SIM process. IKE/EAP-SIM messages are exchanged as previously described. However, in this embodiment, LAN-UNC provides its own credentials as part of the challenge-response process and is authenticated by the cellular network on this basis. The resulting IPSec transport tunnel is based upon mutual authentication between LAN-UNC and the cellular network. This process may be performed manually or may be automated. In an exemplary embodiment, LAN-UNC includes a USB (Universal Serial Bus) port adapted to receive a SIM module. When a SIM module is detected at the USB port, LAN-UNC executes an automated tunnel formation procedure. Using the cellular shared secret (Ki) and GSM algorithms stored on the USB-SIM module, the IPSec transported tunnel is formed with little or no outside intervention.

Figure 17:
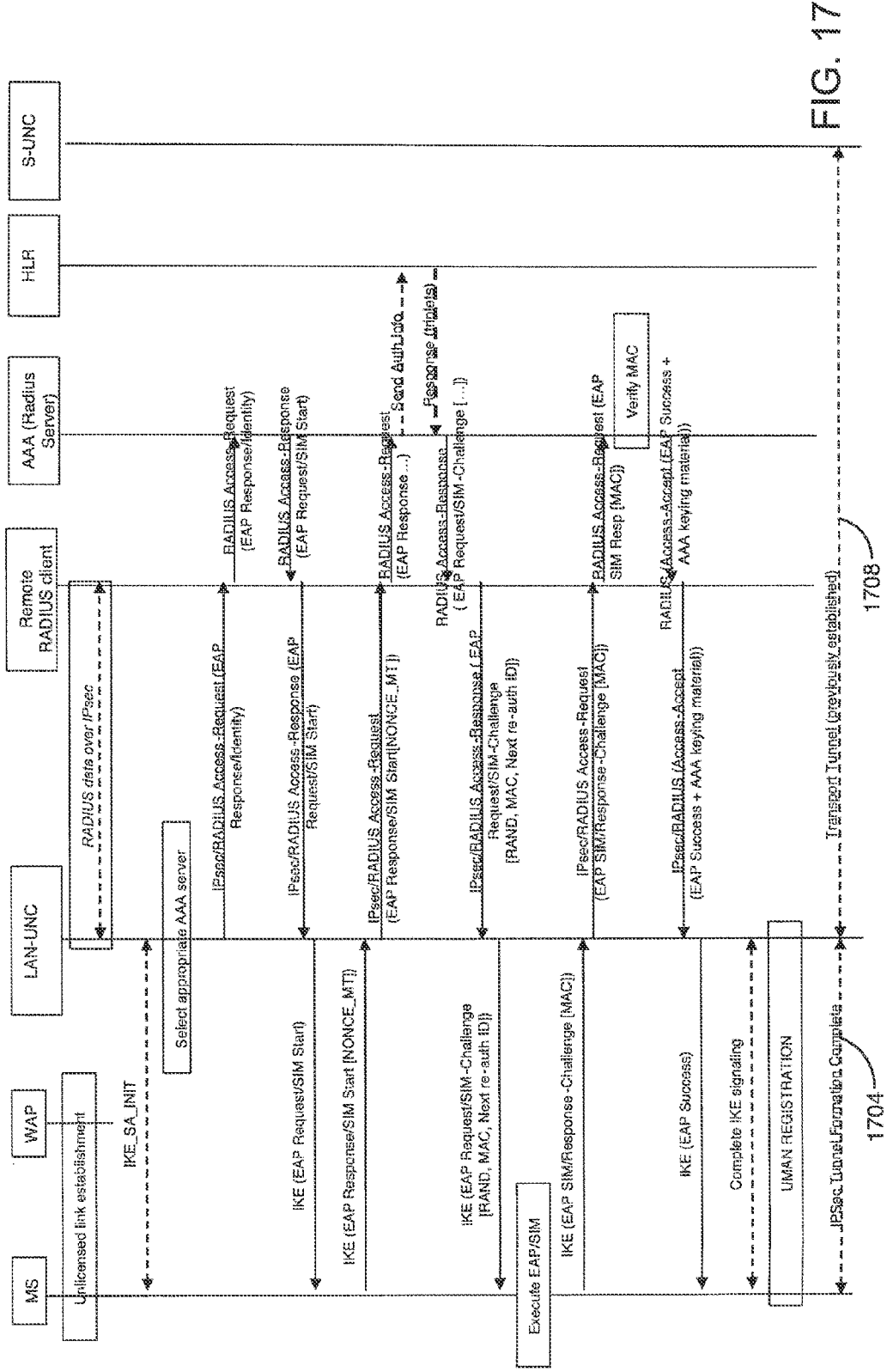
FIG. 17 shows parts of an authentication process conducted in accordance with another embodiment of the present invention.

FIG. 17 shows parts of an authentication process conducted according to another embodiment of the present invention. In this embodiment, a mobile station MS authenticates with the cellular network using an IKE/EAP-SIM process as previously described. Authentication is administered by a remote RADIUS client. This arrangement can be appreciated with reference to FIG. 15. LAN-UNC interacts with the remote RADIUS client to authenticate mobile station MS. Upon successful authentication, an IPSec tunnel 1704 is formed between MS and LAN-UNC over the local area network. In addition, LAN-UNC may signal S-UNC to modify or re-program the security association of transport tunnel 1708. For example, addressing information associated with MS may be added to an access list that controls which packets are allowed to enter the transport tunnel.

III. Discovery & Registration

A. Address Substitution

Figure 18A:
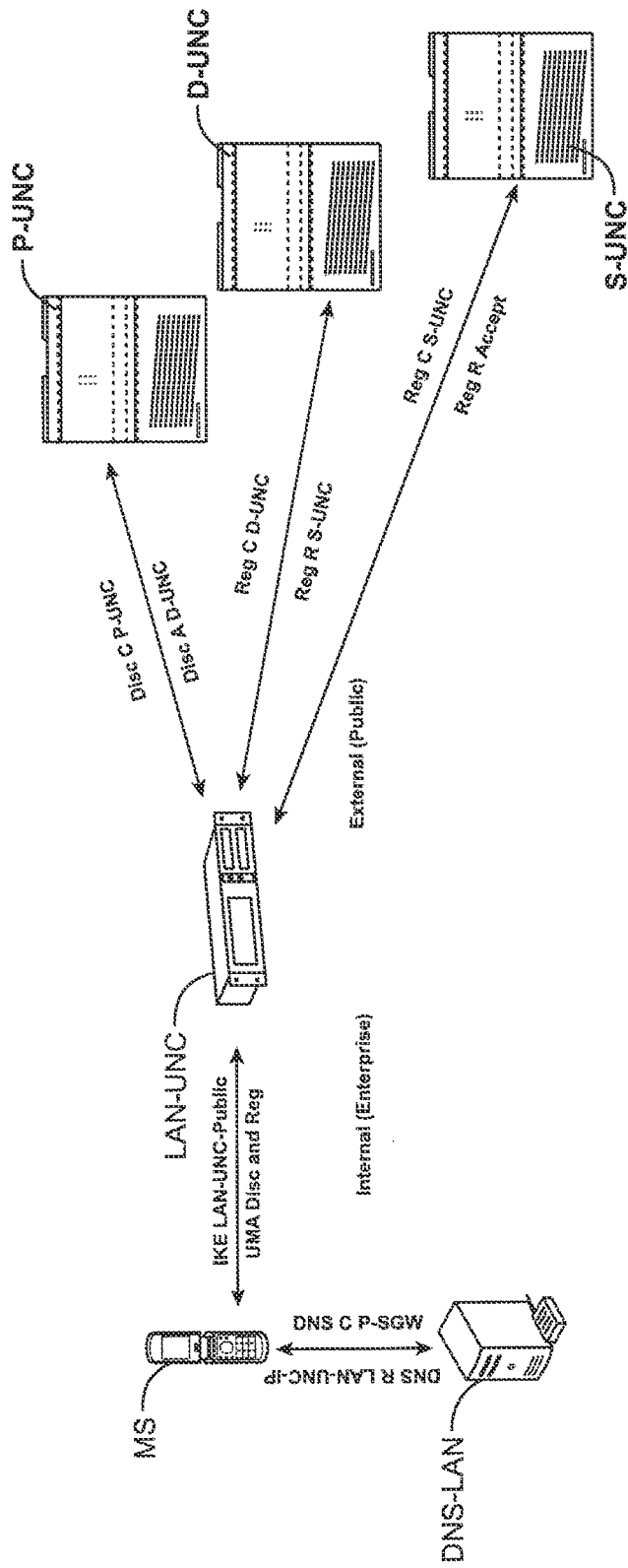
FIGS. 18A and 18B show parts of a discovery process for a mobile station that has not previously accessed UMA service according to an embodiment of the present invention.
Figure 18B:
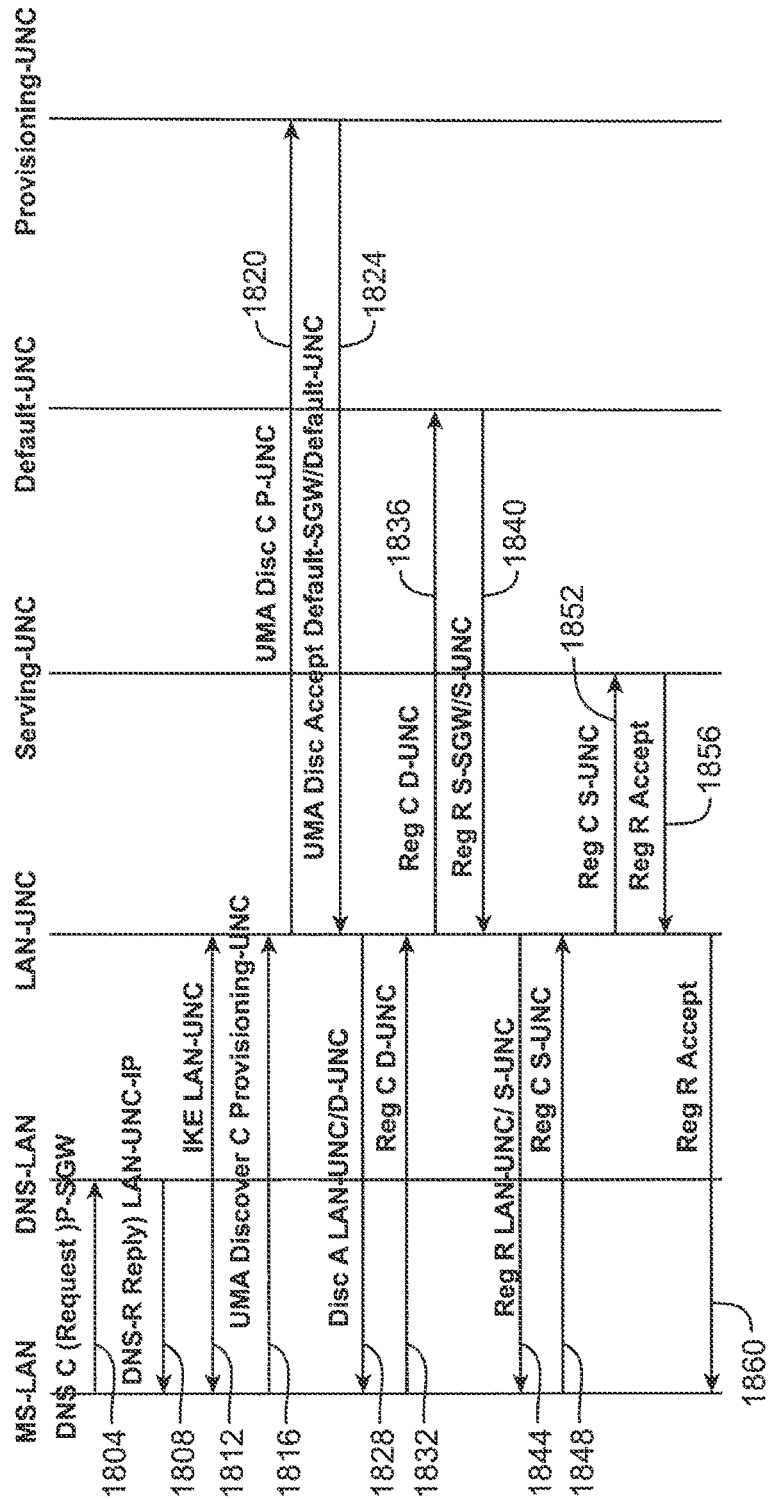

A LAN-based UMA network controller according to the present invention may also participate in the discovery process by which a UMA device acquires the address of a default UNC. FIGS. 18A and 18B show parts of a discovery process for a mobile station MS that has not previously accessed UMA service according to one embodiment of the present invention. In a typical configuration, MS will be supplied with the fully-qualified domain name (FQDN) of a provisioning UNC (P-UNC) when it is placed into service. In some cases, the FQDN points to a security gateway at P-UNC (P-SGW). When UMA service is requested, mobile station MS may attempt to contact P-SGW.

This process may begin when MS makes a DNS request including addressing information for P-SGW. The DNS request may be received 1804 by a DNS server (DNS-LAN) located within the local area network. In some embodiments, DNS-LAN is configured to respond to the DNS request by substituting an address 1808 for a LAN-based UMA network controller (LAN-UNC). When mobile station MS receives the IP address of LAN-UNC, it may initiate an IKE process 1812 as previously described. As shown, LAN-UNC responds 1820 by contacting P-UNC and initiating an authentication process. For example, LAN-UNC may proxy a connection between mobile station MS and P-UNC. As part of the authentication exchange, LAN-UNC may provide P-UNC with the IMSI and LAI (location area identity) for mobile station MS. P-UNC may respond 1824 by providing an address for a default UNC (D-UNC).

In a next sequence of exchanges, mobile station MS may attempt to register with D-UNC 1832 using the addressing information received from P-UNC. At this point, LAN-UNC may terminate the previous connection to P-UNC and initiate a new connection 1836 with D-UNC. As shown, D-UNC may respond with addressing information 1840 for an appropriate serving UNC (S-UNC) based upon the location of mobile station MS. LAN-UNC relays this addressing information 1844 to mobile station MS. In some circumstances, additional stages of the discovery process may be required before locating S-UNC. In exemplary embodiments, LAN-UNC actively monitors each stage of the discovery process and replaces all UMA signaling replies containing security gateway addressing information with its own FQDN or IP address.

In a final round of exchanges, mobile station MS may attempt to register 1848 with S-UNC using the addressing information provided by D-UNC. If not already done, LAN-UNC may terminate its connection to D-UNC and initiate a new connection 1852 to S-UNC for communicating the registration request. If S-UNC accepts the registration request 1856, the discovery is complete and mobile station is successfully registered. At this point, serving UNC provides information to enable MS access the UMA network.

Figure 19A:
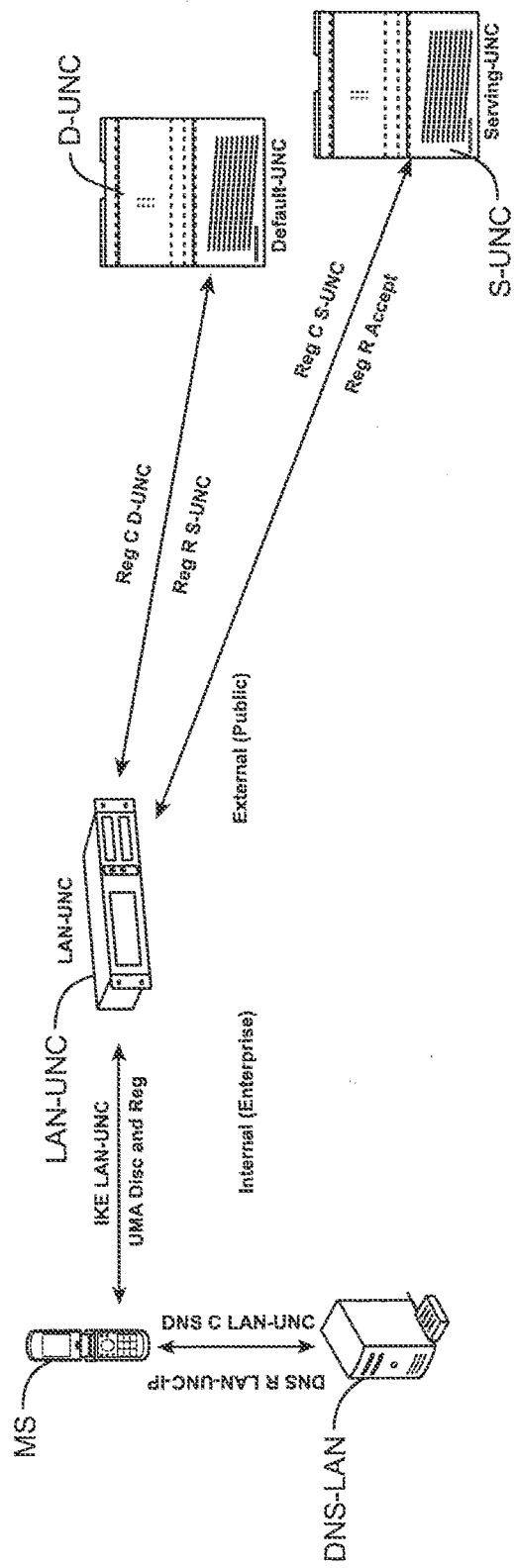
FIGS. 19A and 19B illustrate portions of a discovery process for a mobile station that has recorded information about a default UMA network controller according to an embodiment of the present invention.
Figure 19B:
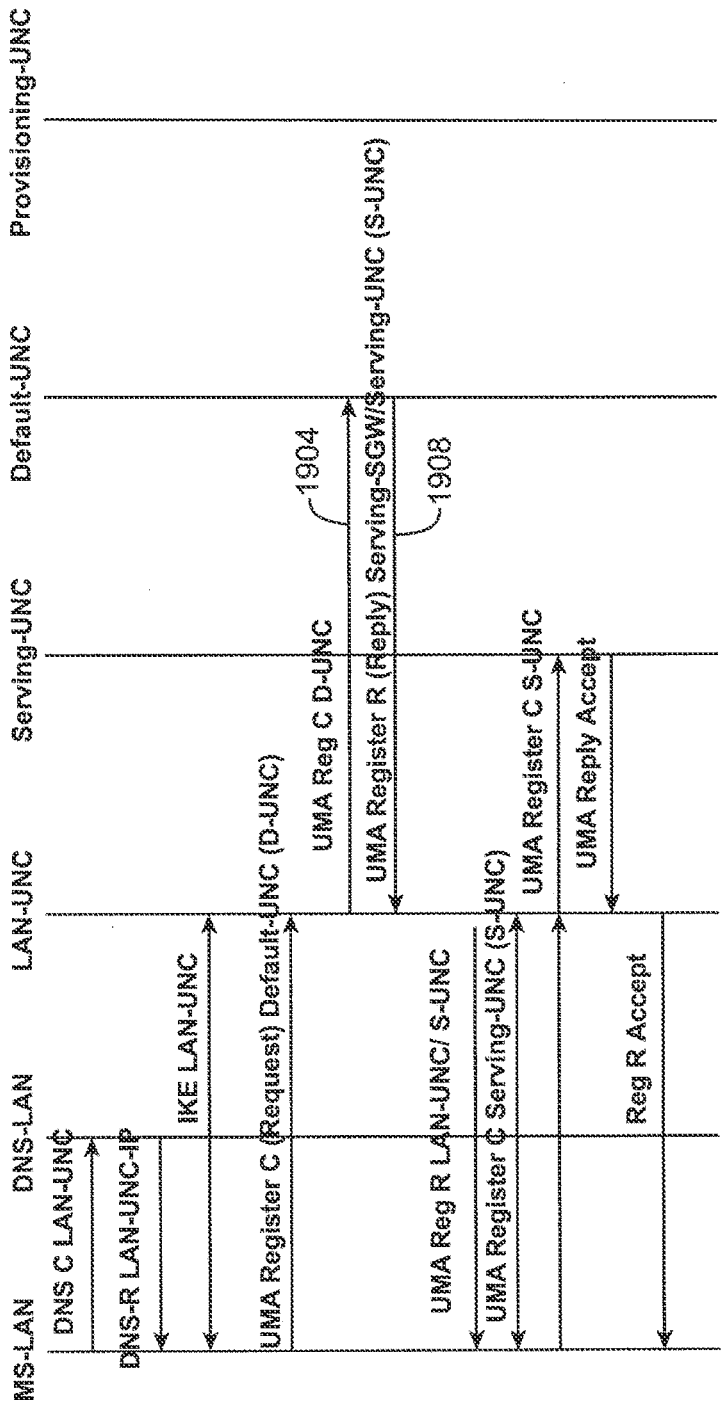

FIGS. 19A and 19B illustrate parts of a discovery process for a mobile station MS that has previously recorded information about a default UMA network controller (D-UNC) according to an embodiment of the present invention. As shown, mobile station MS uses stored addressing information to send a registration request to D-UNC without first contacting a provisioning UNC. Thus, MS discovers the address for serving UNC (S-UNC) after only one round of exchanges.

Figure 20A:
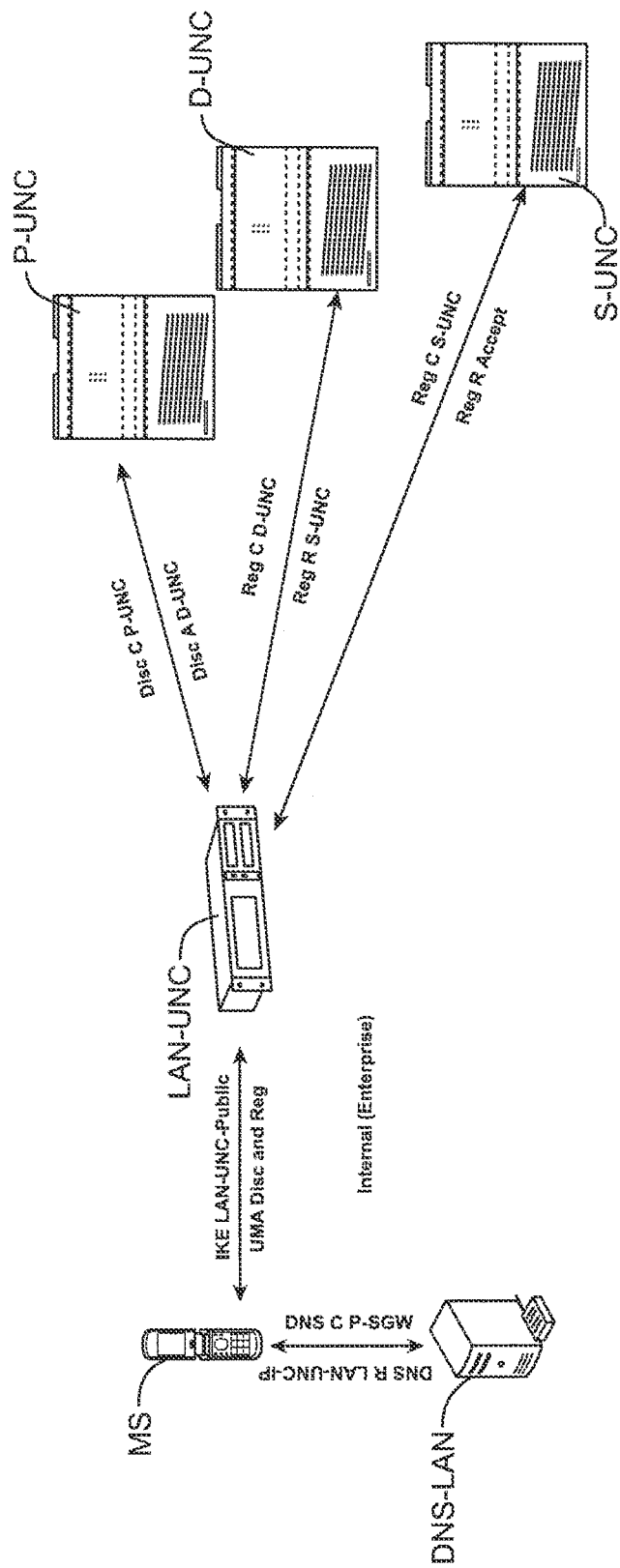
FIGS. 20A and 20B illustrate parts of a discovery process for a mobile station MS provisioned with the full-qualified domain name of a LAN-UNC in accordance with an embodiment of the present invention.
Figure 20B:
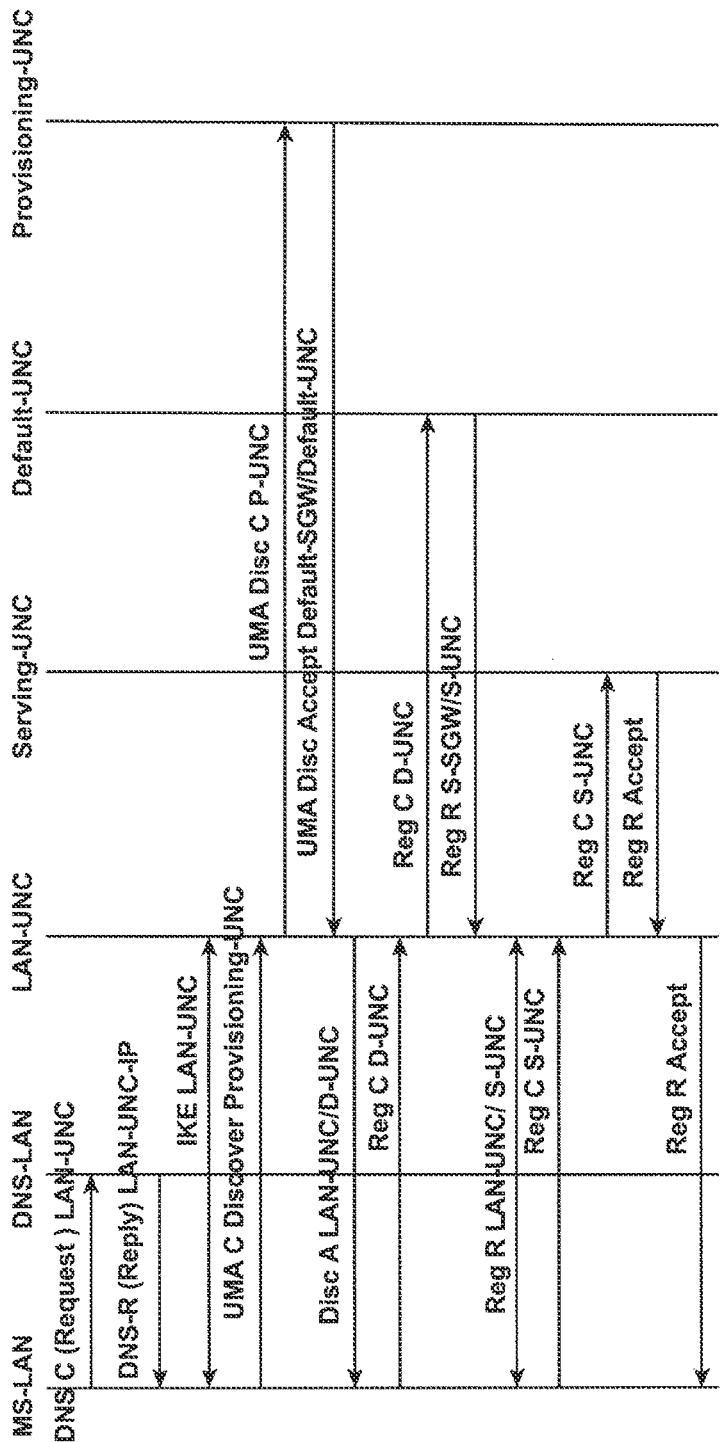

FIGS. 20A and 20B illustrate parts of a discovery process for a mobile station MS that has been provisioned with the fully-qualified domain name of a LAN-based UMA network controller (LAN-UNC) according to one embodiment of the present invention. In this case, address substitution is not required. Mobile station MS requests and receives addressing information for LAN-UNC. Following an IKE exchange, LAN-UNC commences with discovery or registration. As shown, mobile station MS issues a discovery request to a provisioning UNC (P-UNC). The subsequent exchanges are as previously described.

B. Forced Re-Provisioning

Figure 21A:
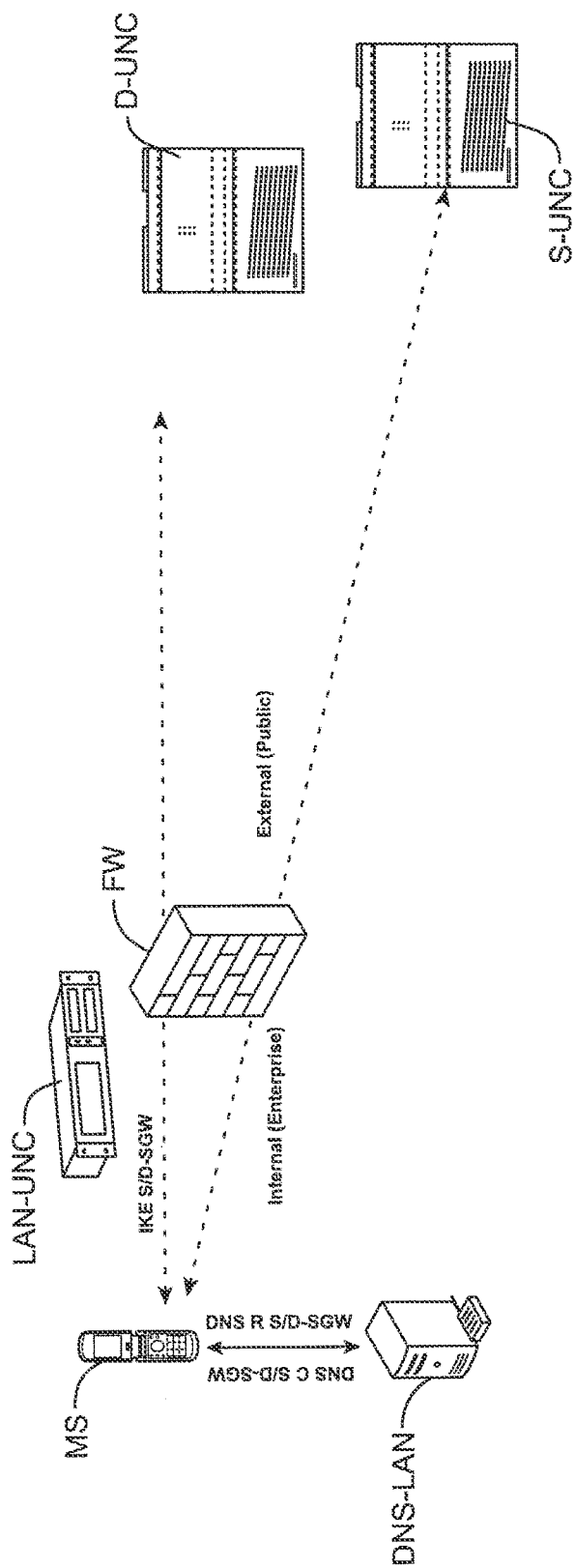
FIGS. 21A and 21B illustrate aspects of a discovery process according to a further embodiment of the present invention.
Figure 21B:
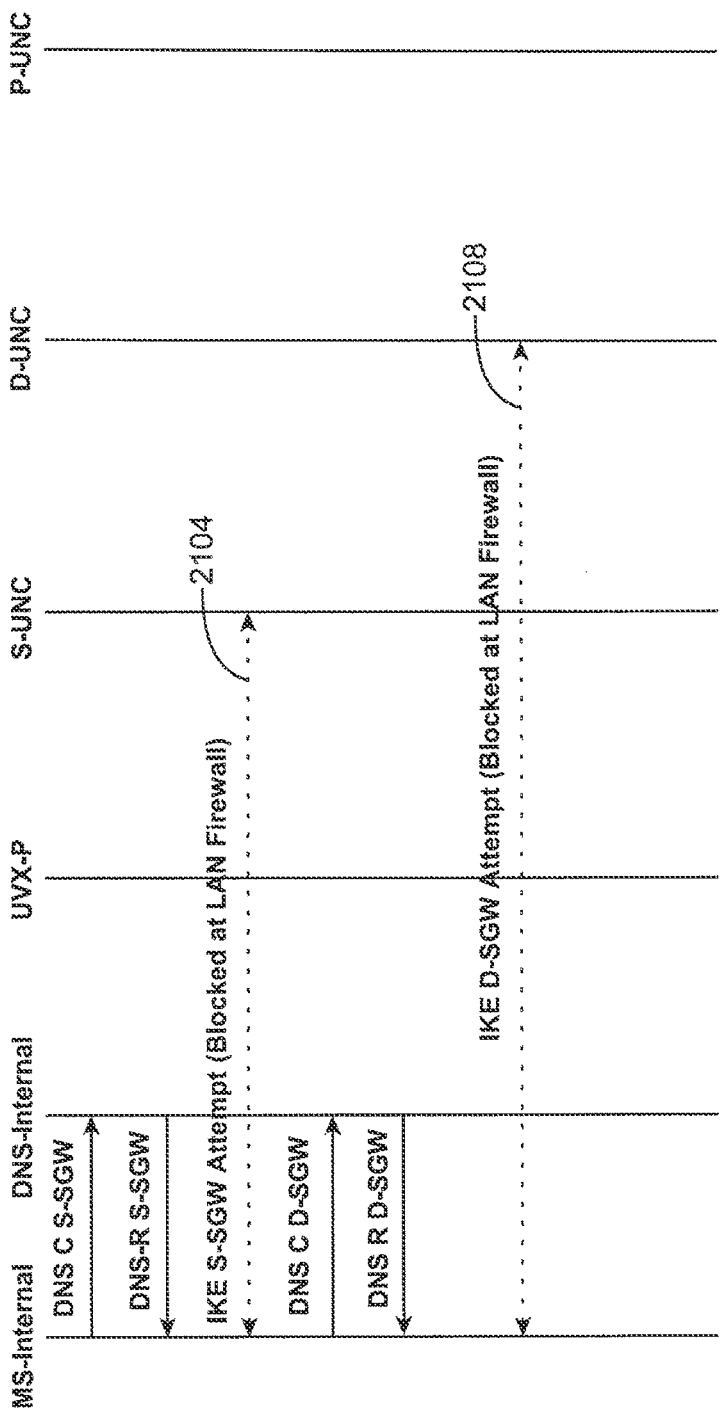

FIGS. 21A and 21B illustrate aspects of a discovery process according to a further embodiment of the present invention. In this embodiment, a firewall (FW) disposed within the local area network is configured to block direct IKE exchanges with UNCs over an external network. This configuration prevents mobile station MS from bypassing LAN-UNC and communicating directly with either S-UNC 2104 or D-UNC 2108. Upon failing to communicate with S-UNC and D-UNC, mobile station MS may attempt to re-start the discovery process by requesting addressing information for its provisioning UNC (not shown). The address of LAN-UNC may then be provided in response to these DNS requests. Before servicing the request, LAN-UNC may verify whether MS is authorized to access UMA services by checking a list of approved devices. If MS is not an approved device, LAN-UNC may send an error message and terminate the IKE process. On the other hand, if MS is authorized to access UMA services, LAN-UNC may mediate a discovery exchange with P-UNC.

Figure 22A:
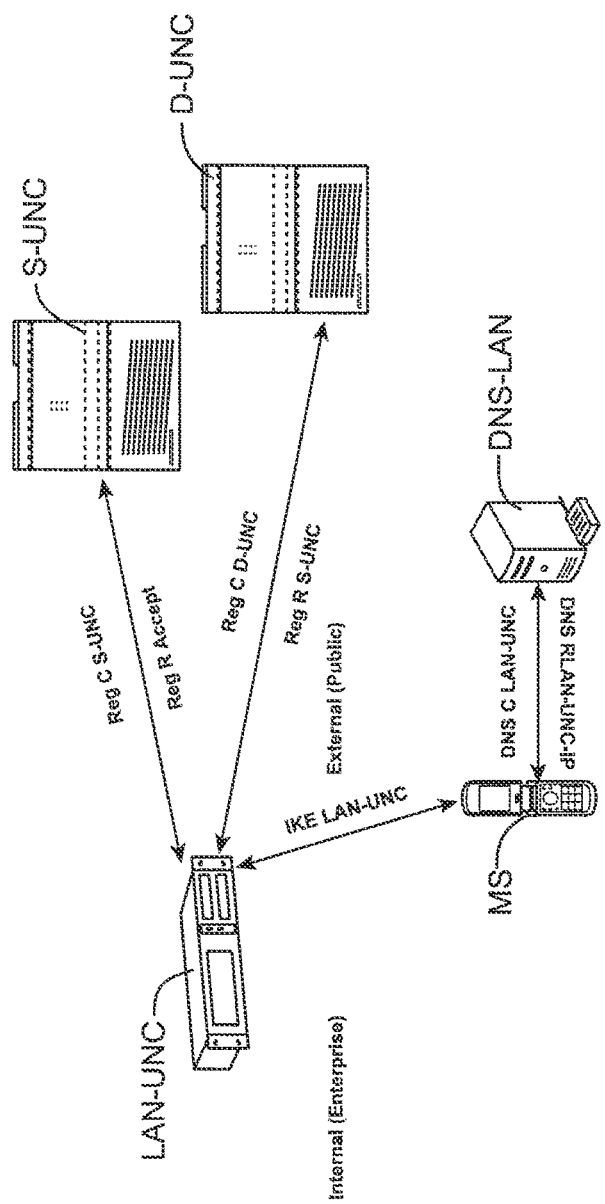
FIGS. 22A and 22B show an embodiment of the present invention in which a LAN-UNC interacts with UMA devices that are not connected to the local area network.
Figure 22B:
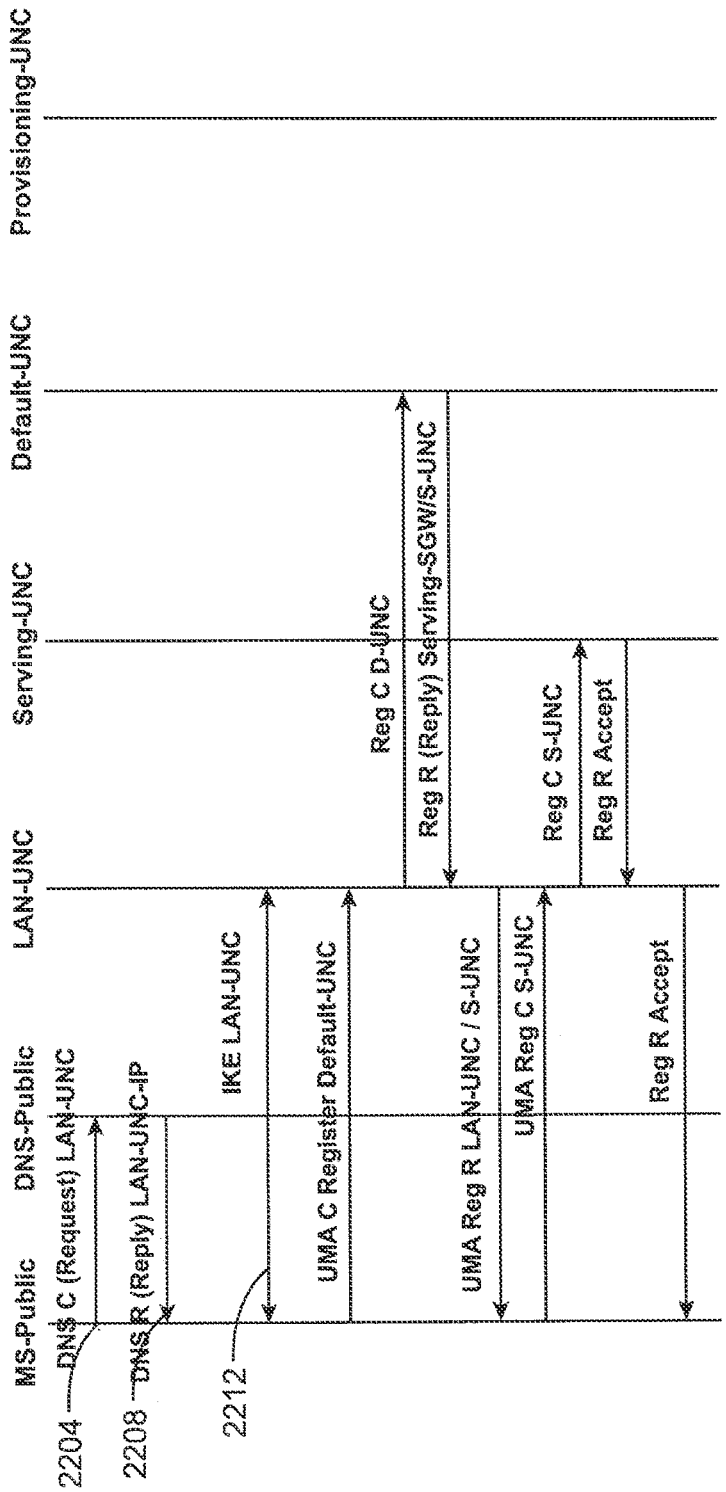

FIGS. 22A and 22B show an embodiment of the present invention in which a LAN-based UMA network controller (LAN-UNC) interacts with a UMA device that is not connected to the local area network. For example, the UMA device may be connected to an external local area network, such as a WiFi HotSpot. In this embodiment, a mobile station MS has stored the address of LAN-UNC as its default security gateway. For example, mobile station MS may have accessed UMA service while connected to the local area network and been forced to re-provision with the FQDN of LAN-UNC.

Mobile station MS may subsequently connect to a public network and wish to register for UMA service. As shown, mobile station MS requests DNS service 2204 from a public DNS server (DNS-PUB) and supplies the FQDN of LAN-UNC. DNS-PUB replies to the request 2208 with the publicly accessible IP address of LAN-UNC. After obtain an IP address for LAN-UNC, mobile station MS initiates an IKE exchange 2212 with LAN-UNC as previously described. At this point, LAN-UNC may assist mobile station MS to complete the discovery and registration process. For example, LAN-UNC may proxy a connection between mobile station MS and a serving-UNC. In this arrangement, all data exchanged between LAN-UNC, mobile station MS, and S-UNC might be carried over the external network. Thus, audio data for calls placed to or from the externally connected mobile station MS would not be localized.

C. Alternative Registration

Figure 23A:
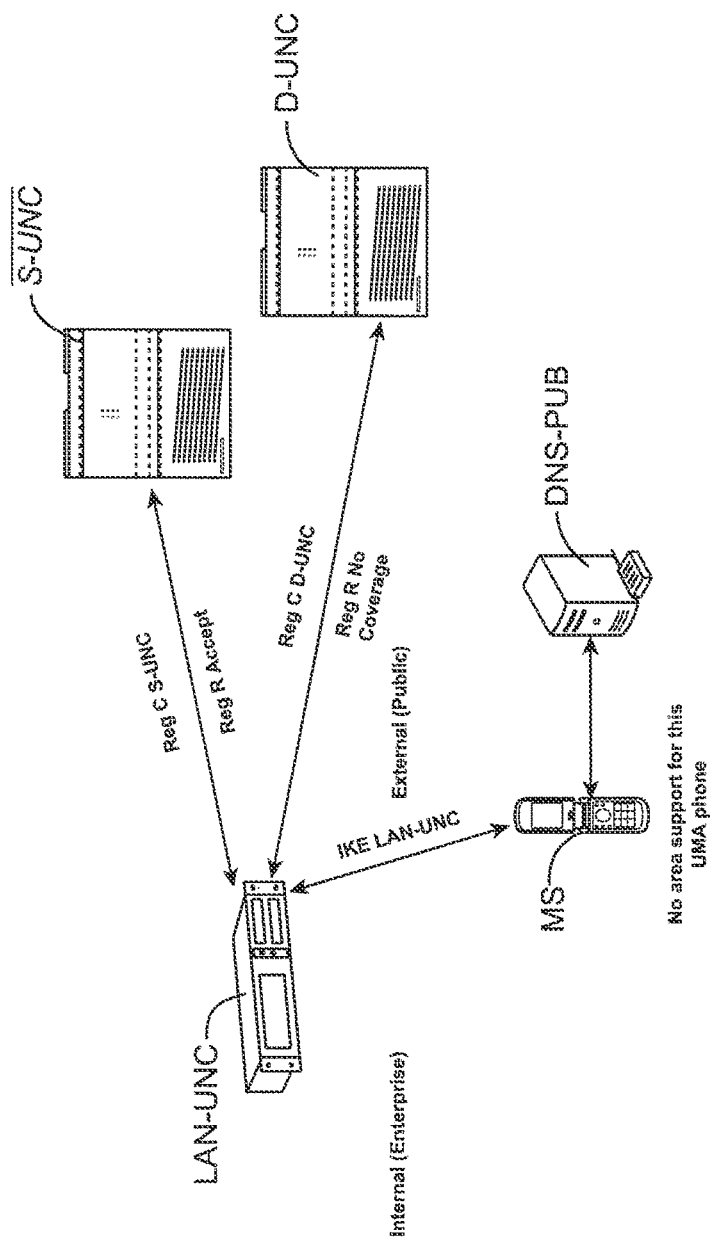
FIGS. 23A and 23B show parts of a registration process conducted in accordance with an embodiment of the present invention.
Figure 23B:
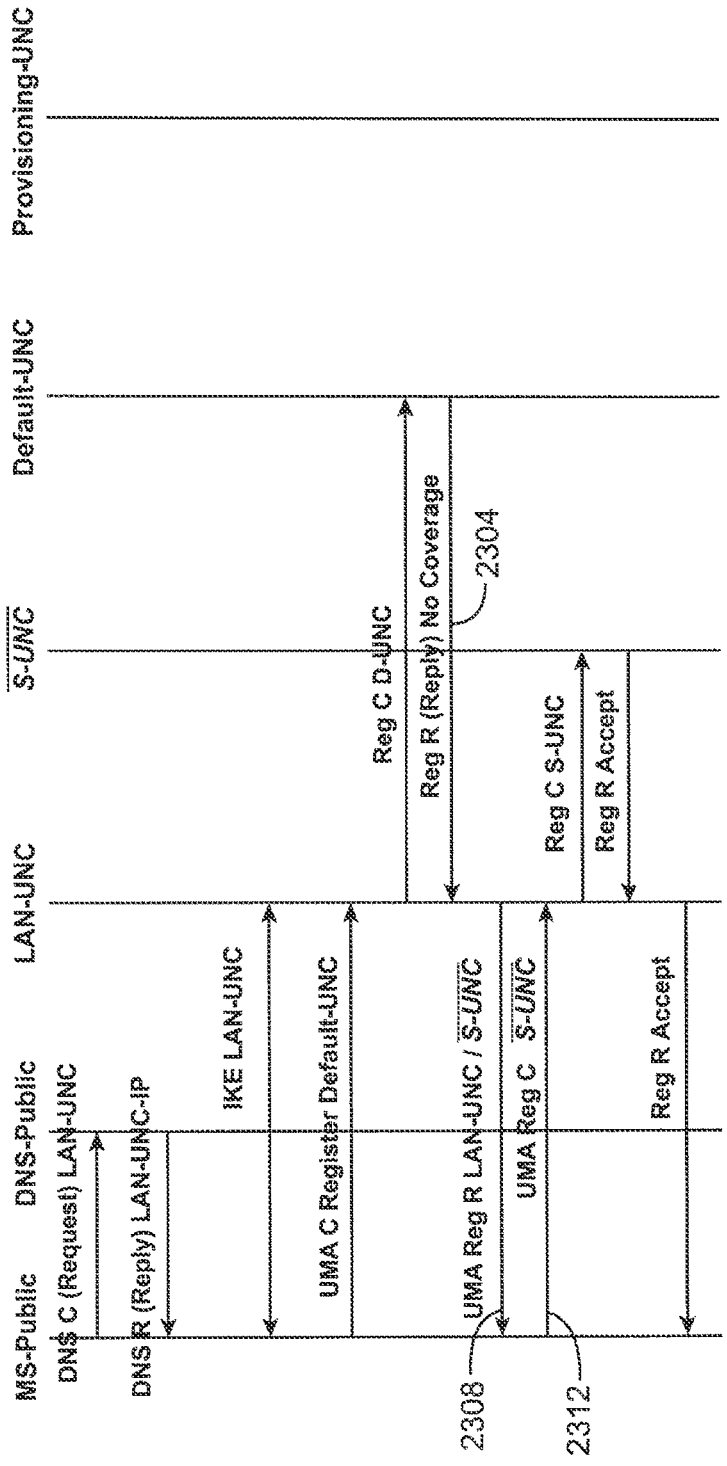

FIGS. 23A and 23B show parts of a registration process conducted according to one embodiment of the present invention. In this scenario, a mobile station MS has accessed UMA service through a LAN-based UMA network controller (LAN-UNC) and subsequently disconnected from the local area network. Later, mobile station MS connects to an outside network and contacts LAN-UNC to assist in the registration process. Default-UNC (D-UNC) responds to the attempted registration 2304 by indicating that service is not available. Alternatively, there may be no reply to the registration request.

In this embodiment, LAN-UNC detects the failed registration attempt 2304 and proceeds to complete the registration process through a pre-determined serving-UNC ($\overline{\text{S-UNC}}$). For example, LAN-UNC may be configured to supply information on behalf of MS to complete the registration process. Thus, whereas $\overline{\text{S-UNC}}$ might deny a registration request received from a mobile station that is located outside of its coverage area, $\overline{\text{S-UNC}}$ accepts the request as properly completed by LAN-UNC. As shown, LAN-UNC provides addressing information for $\overline{\text{S-UNC}}$ 2308 to mobile station MS in place of a failed (or missing) registration response. Mobile station MS may then proceed to compete registration 2312 through $\overline{\text{S-UNC}}$.

Figure 24A:
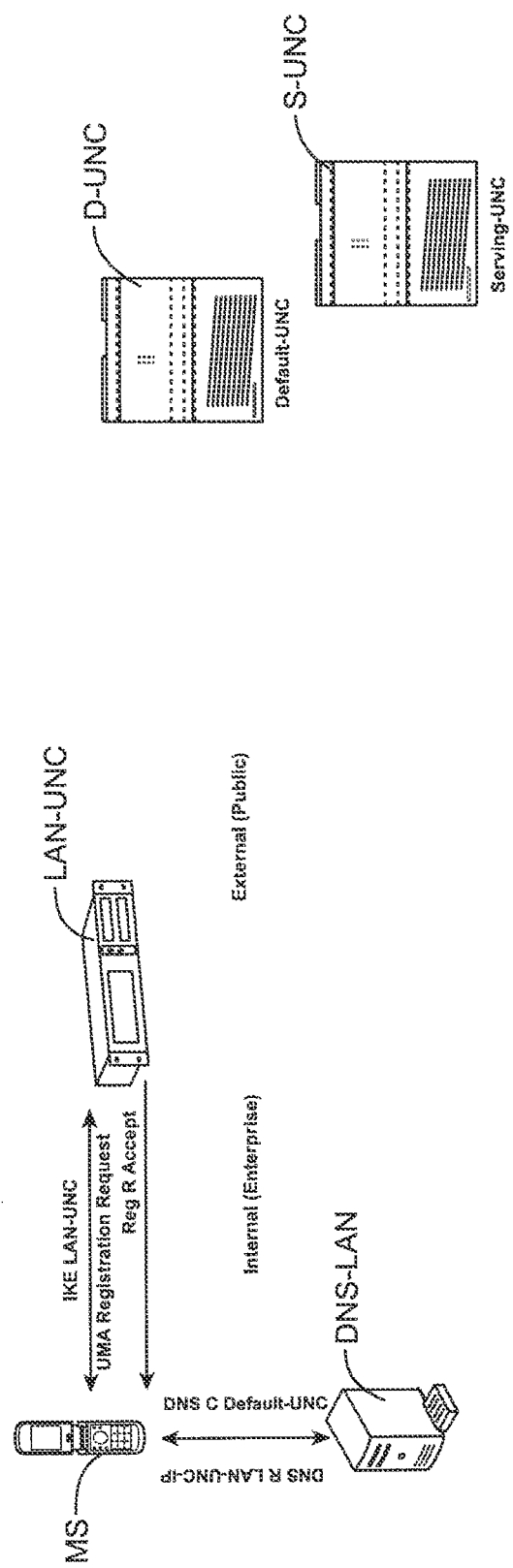
FIGS. 24A and 24B show portions of a registration process conducted according to a further embodiment of the present invention.
Figure 24B:
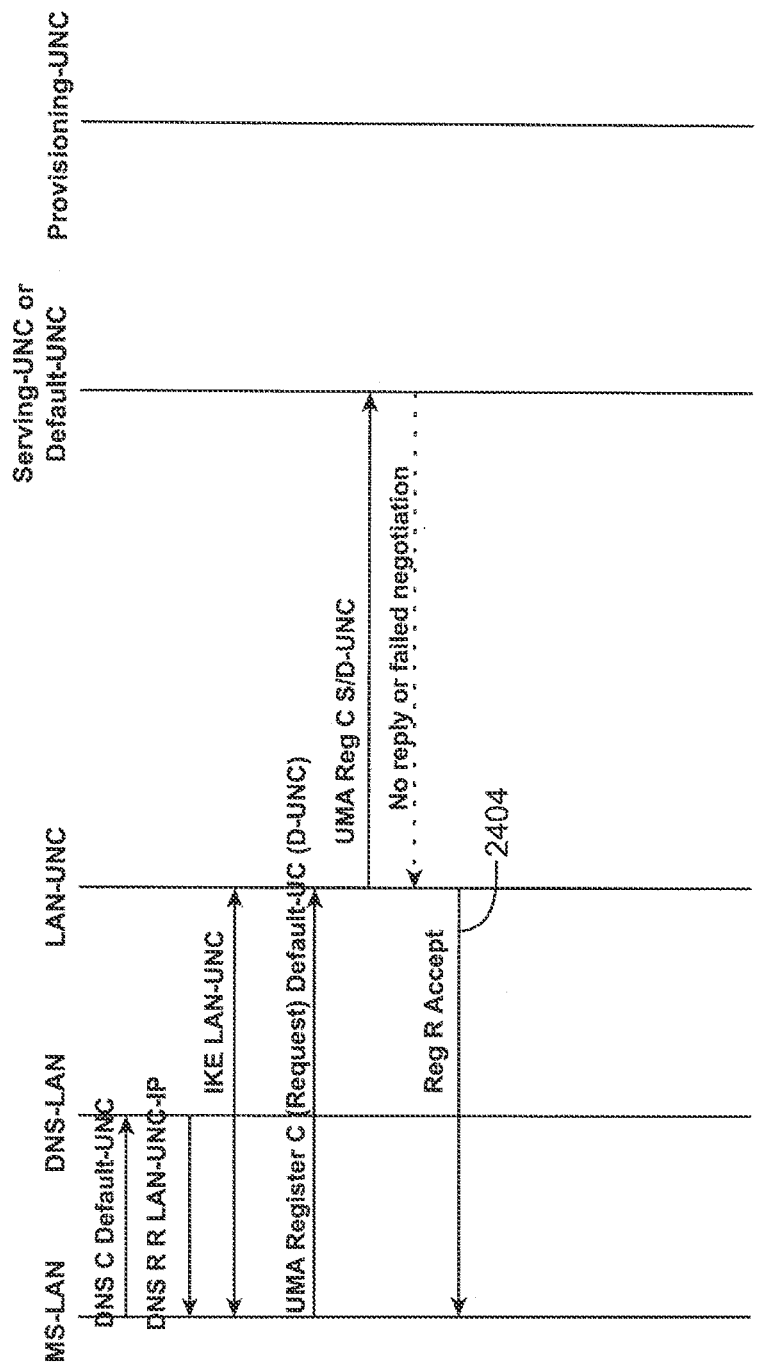

FIGS. 24A and 24B show portions of a registration process conducted according to a further embodiment of the present invention. In this embodiment, a mobile station MS has failed to register with an appropriate serving-UNC (S-UNC). For example, service on the external network may have been interrupted due to a network outage. In such cases, LAN-UNC may complete the registration process locally 2404 and permit mobile station MS to access LAN-based resources. As part of local registration, for example, LAN-UNC may add an entry for mobile station MS to a device location table. Thereafter, audio data for calls between mobile station MS and other UMA devices connected to the local area network may be localized as previously described. In addition, after local registration is complete, LAN-UNC may connect mobile station MS to an application data server through which it can access data services as previously described. Local registration may also permit mobile station MS to interoperate with other LAN-based communication devices as discussed below.

D. Interoperability

Figure 25:
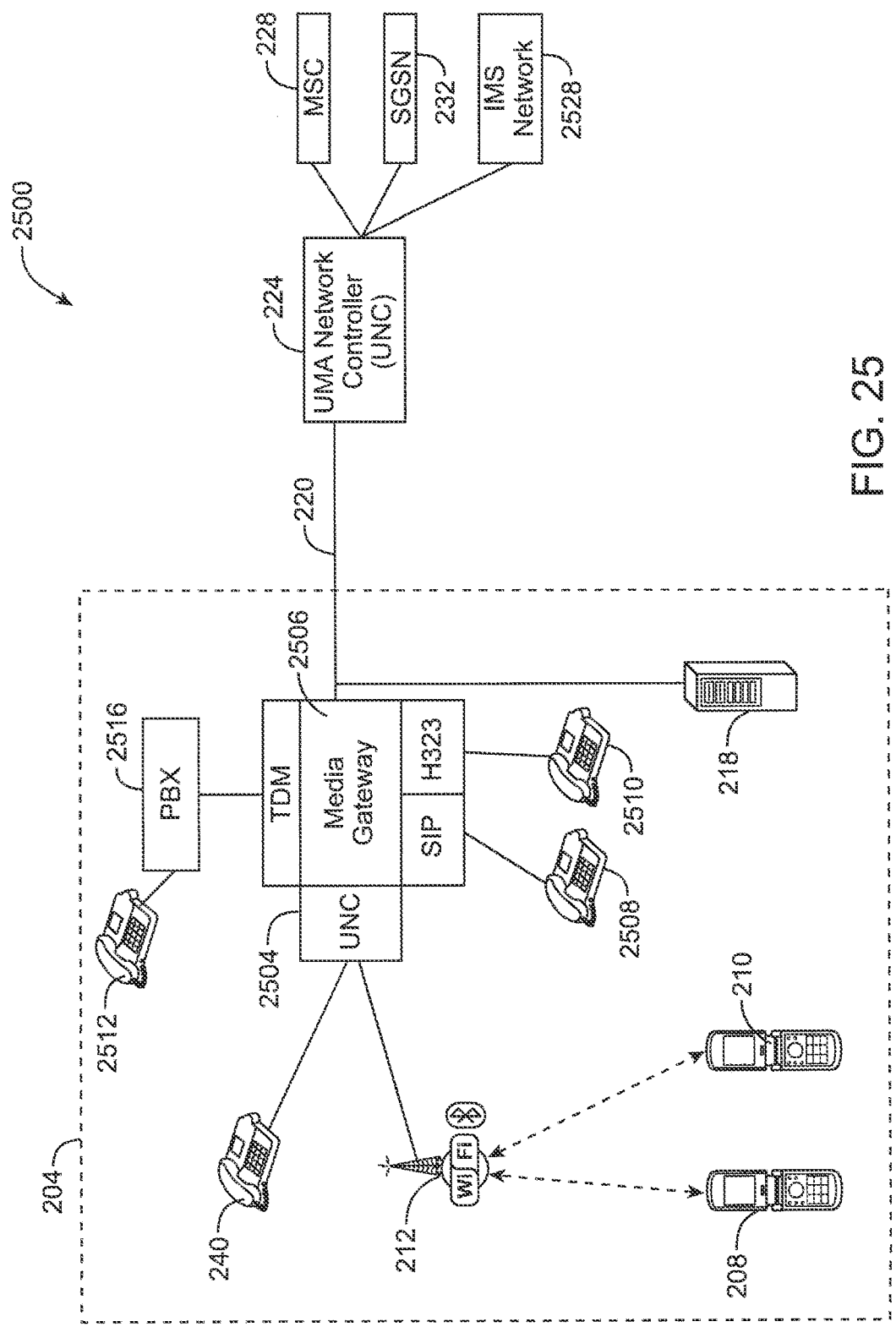
FIG. 25 shows a LAN-UNC operating as part of a UMA communication system in accordance with an embodiment of the present invention.

FIG. 25 shows a LAN-based UMA network controller operating as part of a UMA communication system in accordance with an embodiment of the present invention. In this embodiment, LAN-UNC 2504 includes or utilizes a media gateway 2506 element. Media gateway 2506 translates protocols and enables communication to flow between different types of devices. As shown, media gateway 2506 is adapted to communicate with SIP device 2508, H.323 device 2510, and TDM device 2512. TDM device 2512 is connected to media gateway 2506 through PBX switch 2516. PBX switch 2516 supports multiple TDM devices as separate extensions.

LAN-UNC 2504 enables calls between UMA devices 208, 210, 240 and non-UMA devices 2508, 2510, 2512 to be carried over local area network 204. This may be accomplished with reference to a device location table. As shown in FIG. 3, device location table 300 stores information about various types of communication devices connected to the local area network. For example, information about SIP devices 308 may include, among other things, a uniform resource locator (URL) for each SIP device connected to LAN 204. Similarly, information about H.323 devices 312 may include, among other things, an IP address for each H.323 device connected to LAN 204. Information about TDM devices, such as a PBX switch extension, may also be stored in the device location table.

LAN-UNC 2504 may check device location table 300 when a call setup procedure is detected involving a LAN-based UMA device 208, 210, 240. Calls between two LAN-based UMA devices 208, 210, 240 may be handled by localizing call audio as previously described. In a similar manner, calls between UMA devices 208, 210, 240 and non-UMA device 2508, 2510, 2512 may also be supported and maintained within local area network 204. In some embodiments, LAN-UNC 2504 retrieves appropriate identifying information for the caller and callee from device location table 300. If caller and callee are both connected to the local area network 204, media gateway 2506 connects the two devices on a the call and transcodes their respective data flows. Audio data then travels back and forth across the local area network. In an exemplary embodiment, a media gateway controller or softswitch supervises this process and provides call control and signaling functionality.

When LAN-UNC 2404 completes a call between a UMA device 208, 210, 240 and a non-UMA device 2508, 2510, 2512, it may or may not send call signaling data to serving-UNC 224. In some embodiments, LAN-UNC 2504 handles calls between UMA devices 208, 210, 240 and non-UMA devices 2508, 2510, 2512 by signaling the MSC to alert it that the UMA device has entered in-call status.

Alternatively, LAN-UNC 2504 may not forward signaling data with respect to calls between UMA devices 208, 210, 240 and non-UMA devices 2508, 2510, 2512 to serving-UNC 224. In this case, MSC 228 might be unaware that a particular UMA device 208, 210, 240 had entered in-call status and might route an incoming call to the UMA device 208, 210, 240 over the UMA network. Depending upon configuration, LAN-UNC 2504 may re-route incoming calls for a UMA device 208, 210, 240 that has entered in-call status to a local voice mail server or an alternative location for the called party.

In some embodiments, LAN-UNC is configured to interact with SIP/IMS Network element 2528. In such embodiments, when a UMA device 208, 210, 240 authenticates and registers through LAN-UNC 2504, LAN-UNC 2504 may send SIP registration and presence signaling to SIP/IMS network 2528. SIP/IMS network 2528 may record the registration and use this information to send calls from the cellular network to LAN-UNC 2504. When a UMA device 208, 210, 240 originates a call, it may send a UMA call setup to LAN-UNC 2504. In response, LAN-UNC 2504 may consult a device location table. If the called party is connected to the local area network, LAN-UNC 2504 may complete the call as previously described. If the called party is not connected to the local area network, LAN-UNC 2504 may send a SIP INVITE message to IMS network 2528. IMS network 2528 may then complete the call by forwarding the SIP INVITE to a SIP proxy server or other SIP entity.

E. Single-Cell

In some embodiments, a LAN-based UMA network controller (LAN-UNC) in accordance with the present invention is capable of performing a complete set of voice and data functions for calls directed to and from UMA devices connected to a local area network. In effect, the LAN-UNC acts as a single-cell within the cellular network and eliminates the need for support from another UNC device.

Figure 26A:
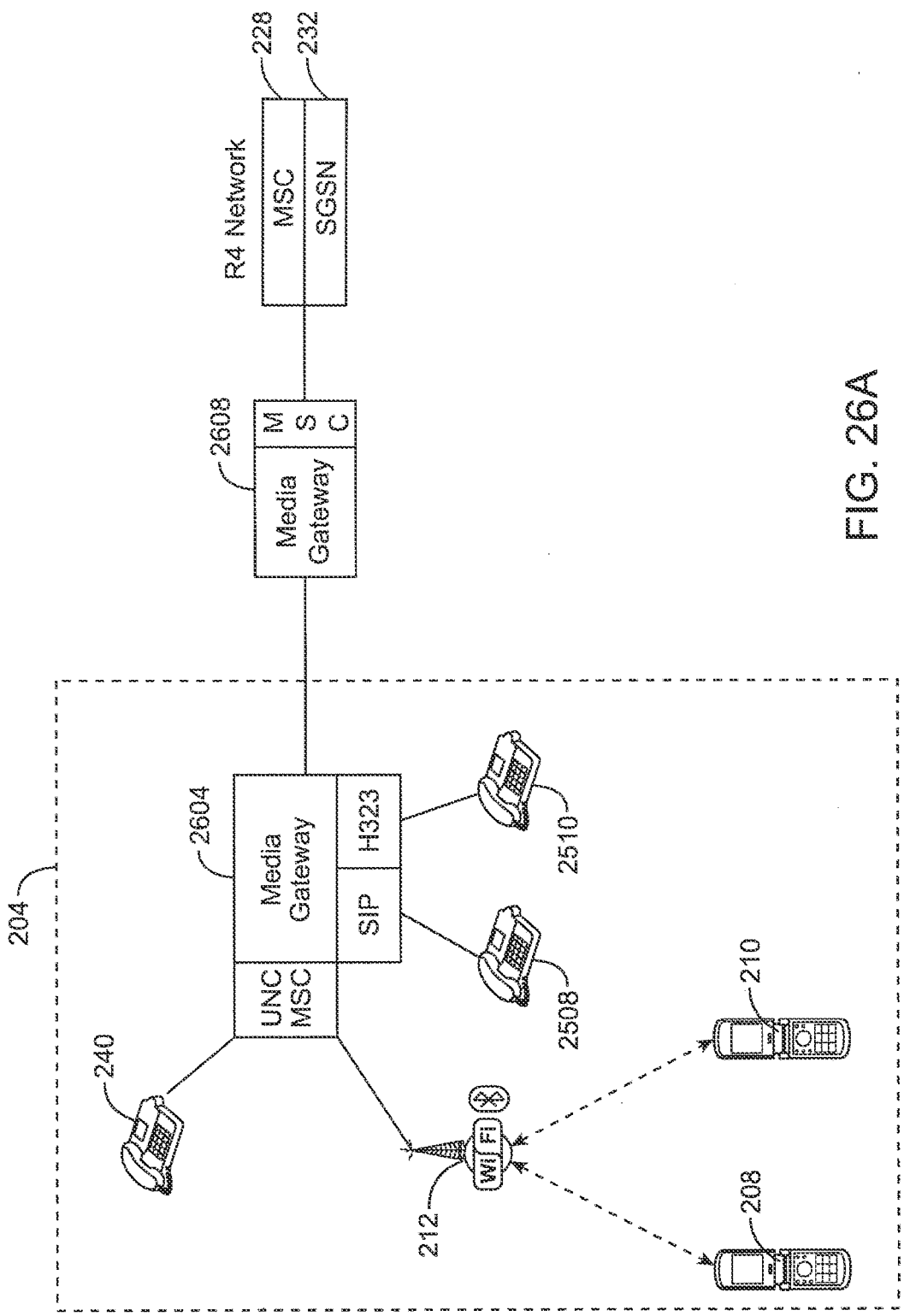
FIGS. 26A and 26B show LAN-UNCs according to additional embodiments of the present invention.

FIG. 26A shows a LAN-based UMA network controller 2604 (LAN-UNC) according to one embodiment of the present invention. In this embodiment, LAN-UNC 2604 provides full UMA networking support for devices within local area network 204. Thus, LAN-UNC 2604 performs the complete set of call processing functions for UMA device 208, 210, 240 and enables interoperability with non-UMA devices 2508, 2510 over the local area network.

As shown, LAN-UNC is connected to MSC 228 and SGSN 232 through an external media gateway 2608. The interface between LAN-UNC 2704 and external media gateway 2608 may be compliant with the UMTS (Universal Mobile Telecommunications System) specification for R4 networks. Thus, voice data exchanged between LAN-UNC 2704 and external media gateway 2608 may remain GSM encoded unless the call destination is on the PSTN (public switched telephone network). In this embodiment, LAN-UNC 2604 localizes audio data for calls between devices connected to the local area network as previously described.

Figure 26B:
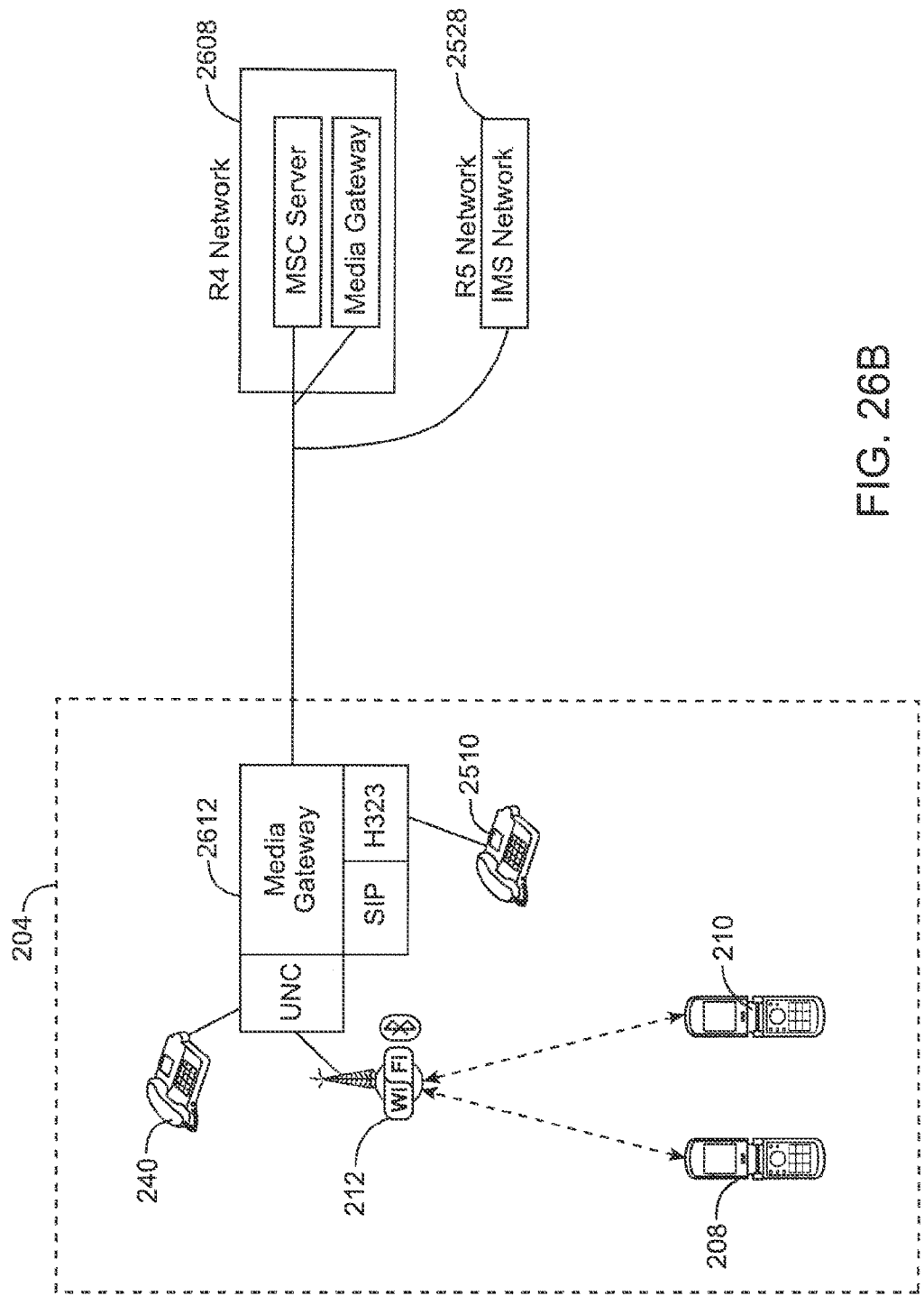

FIG. 26B shows a LAN-based UMA network controller 2612 (LAN-UNC) according to another embodiment of the present invention. In this embodiment, LAN-UNC 2612 interfaces with a UMTS network 2608 and an IMS network 2528. When LAN-UNC 2612 successfully authenticates and registers a UMA device with the core cellular network, it may also send SIP registration and signaling data to a SIP or IMS server as previously described. In this way, LAN-UNC 2612 can cooperate with IMS network 2620, or other SIP-based network, to complete calls. Audio data for calls between devices that are connected to the local area network is localized as previously described.

IV. Exemplary Procedures

Figure 27:
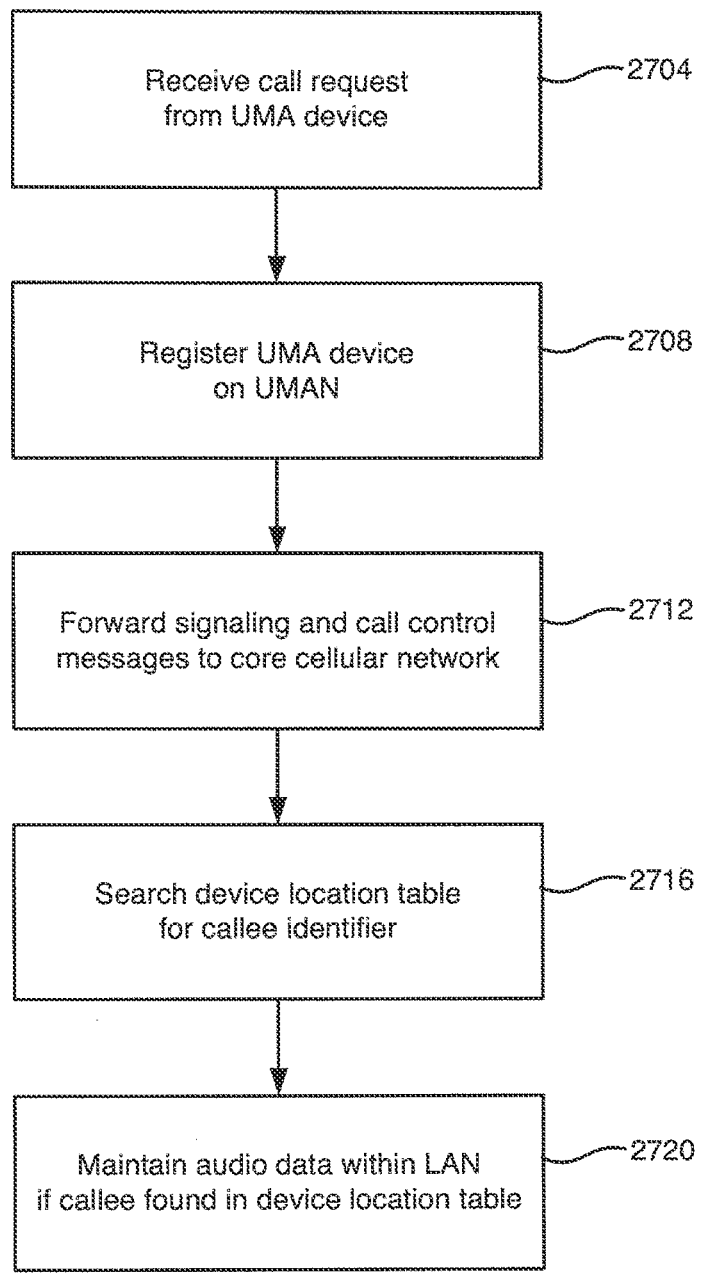
FIG. 27 is a flow chart showing steps performed to localize call audio data according to an embodiment of the present invention.

FIG. 27 is a flow chart showing steps performed to localize call audio data according to an embodiment of the present invention. In a first step 2704, a call request is received from a UMA device connected to the local area network. The request may include one or more packets containing UMA messages. In a next step 2708, the UMA device is registered as part of the UMA network. In some configurations, the LAN-based UMA controller acts as a proxy for packets exchanged between the calling UMA device and a serving UNC. It may therefore participate in various ways as part of the discovery, authentication, and registration processes. In other embodiments, the LAN-based UMA controller replaces the serving UNC and performs these functions within the local area network.

After the calling UMA device has been registered on the UMA network, the LAN-based UNC forwards appropriate signaling and call control messages to the core cellular network 2712. The manner in which call signaling data is sent depends upon how the LAN-based UNC is configured. For example, in a proxy configuration, packets containing UMA signaling and control messages are sent through an internet-based tunnel to the serving UNC. The packets are then directed to a mobile switching center (MSC) through a voice port on the serving UNC. In other configurations, the LAN-based UNC may process these packets within the local area network and communicate call signaling and control information directly to an MSC server or SIP/IMS server.

In a next step 2716, the LAN-based UNC checks its device location table for an entry corresponding to the called party. This check is performed to determine whether both parties to the call are connected to the local area network. If an entry corresponding to the called party is found in the device location table, this indicates that callee is connected to the local area network and is able to receive calls. In this case, the LAN-based UNC retrieves the callee's address information (unique identifier) and prepares to complete the call. Different types of addressing information may be retrieved depending upon device type.

If an entry for the called party was found, the LAN-based UNC maintains the audio portion of the completed call within the local area network 2720. Thus, the LAN-based UNC may receive a VoIP data flow from a caller UMA device and deliver it over the local area network to a callee UMA device. If the call is placed between different types of devices, the LAN-based UNC may translate between different communication protocols. For example, a media gateway element of the LAN-based UNC may convert call data between supported formats. In each case, however, call audio is maintained in the local area network and does not travel over an external network. When the call is completed, the LAN-based UNC may take steps to tear down the connection and to update its call status information.

Figure 28:
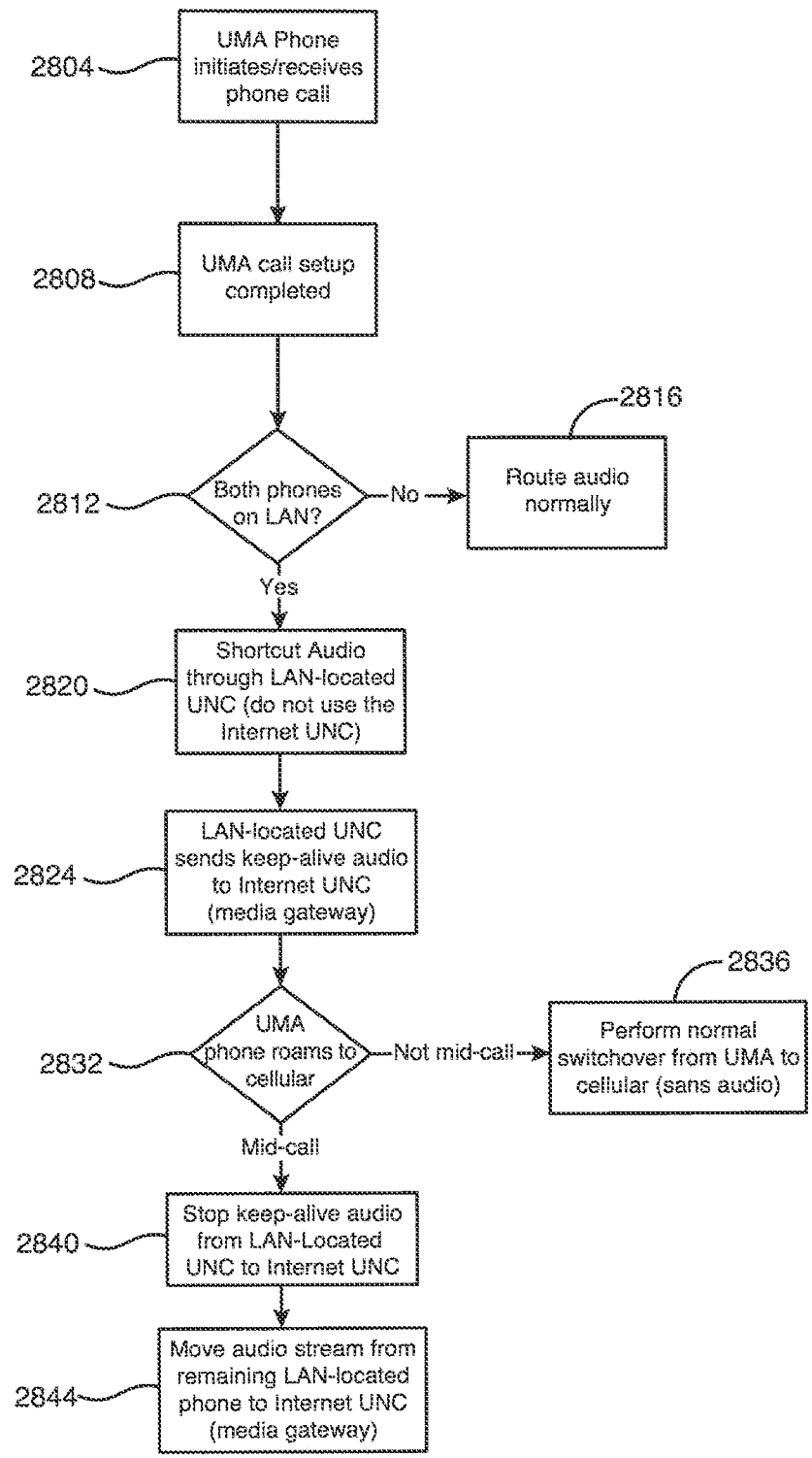
FIG. 28 is a flow chart showing steps performed as part of a handover process according to an embodiment of the present invention.

FIG. 28 is a flow chart showing steps performed as part of a handover process according to an embodiment of the present invention. In a first step 2804, a UMA device connected to the local area network initiates or receives a voice call. Packets representing this activity are detected by the LAN-UNC and a call setup process is initiated. The call setup process may involve various aspects of discovery, authentication, and registration as previously described. When call setup is completed 2808, the LAN-UNC determines if both parties to the call are connected to the local area network 2812. If one calling party is not connected to the local area network, audio data is routed normally 2816 to its destination on the external network.

If both parties to the call are connected to the local area network, the LAN-UNC short-cuts the call audio data 2820. Packets detected as representing call audio are maintained within the local area network and are not transmitted over the external network. LAN-UNC also generates "keep-alive" packets 2824 and sends them either to an internet-based UNC or a media gateway. Keep-alive packets ensure that the voice connection is maintained while short-cutting call audio. At step 2832, a handover process is initiated by a UMA device. If the call terminates before handover begins, a normal transition occurs to the cellular network 2836.

Additional steps are performed as part of a mid-call handover. First, the LAN-UNC stops sending keep-alive audio packets over the external network 2840. Next, the audio stream from the calling party that remains connected the local area network is transferred either to an internet-based UNC or a media gateway 2844. In this way, the call continues uninterrupted.

Figure 29:
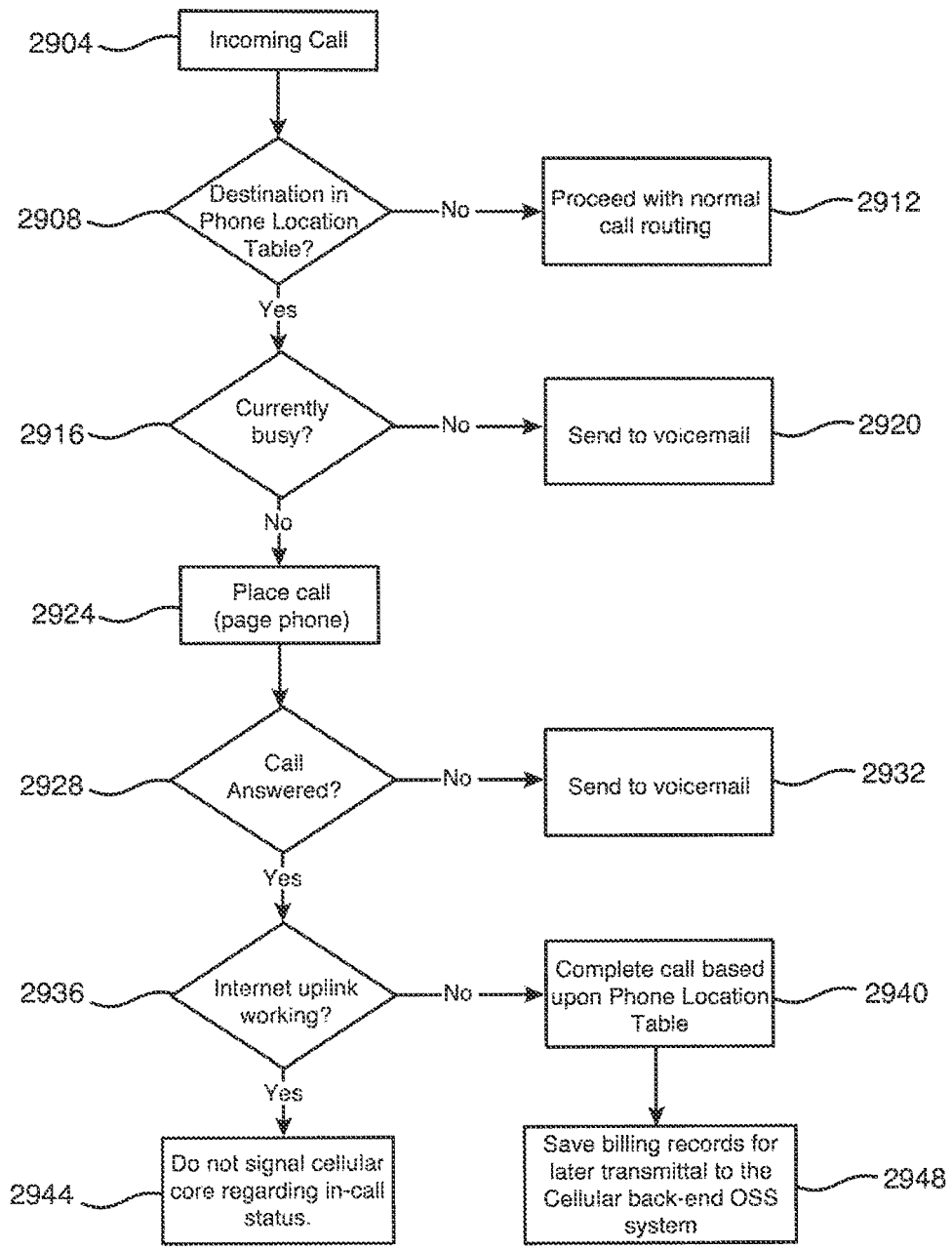
FIG. 29 is a flow chart showing a local call completion process according to an embodiment of the present invention.

FIG. 29 is a flow chart showing a local call completion process according to an embodiment of the present invention. In a first step 2904, packets representing an incoming call are detected by a LAN-based UMA network controller (LAN-UNC). LAN-UNC determines an entry corresponding to the call recipient is stored in a device location table 2908. If call recipient information is not found in the device location table, the LAN-UNC routes the call normally 2912.

As a next part of the process, the LAN-UNC determines whether the call recipient is on another call 2916. If the call recipient is on another call, LAN-UNC routes the incoming call to a voicemail server 2920. Alternatively, in some embodiments, LAN-UNC may re-route the incoming call to another destination on the local area network. Next, LAN-UNC pages the call recipient 2924 and detects whether the call is answered 2928. If there is no answer, LAN-UNC may direct the incoming call to a voicemail server 2932 as previously described.

If the call is answered, the LAN-UNC determines whether it can access the external network. In some embodiments, the LAN-UNC checks an internet uplink 2936. If the internet uplink is not available, the LAN-UNC proceeds to complete the call using information from the device location table 2940. In this case, billing information 2948 and other transactional data are saved and may later be transmitted to a cellular provider. If the internet uplink is available, the LAN-UNC proceeds to complete the call locally. In this situation, LAN-UNC completes the call locally and does not signal the cellular core network 2944.

Figure 30:
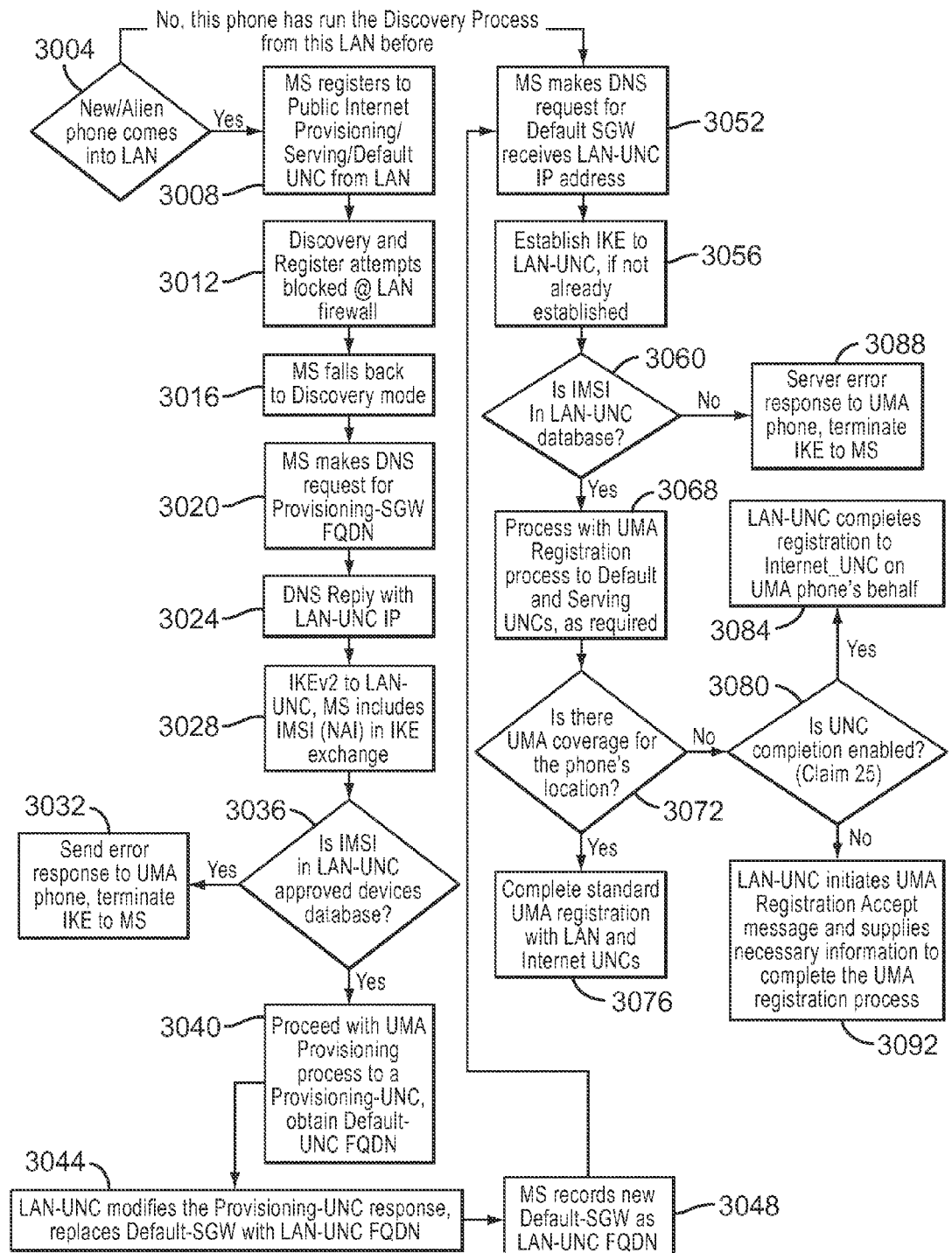
FIG. 30 is a flow chart showing steps performed as part of a discovery and registration process according to one embodiment of the present invention.

FIG. 30 is a flow-chart showing various steps performed as part of a discovery and registration process according to one embodiment of the present invention. In a first step 3004, a mobile station MS connects to the local area network. The next step depends upon whether MS has previously accessed UMA service through the local area network. If MS has not previously accessed UMA service through the local area network, it attempts to discover and register with a UMA network controller 3008 located outside of the local area network. For example, MS may attempt to access the internet and contact a default or serving UMA network controller.

A firewall service detects the attempted discovery and registration 3012 and blocks access to the external network. At this point, MS falls back into discovery mode 3016 and requests the IP address corresponding to its provisioning UMA network controller (P-UNC) from a DNS server on the local area network 3020. This request may include the fully-qualified domain name (FQDN) for P-UNC. At step 3024, resources on the local area network respond to the DNS request from MS with the IP address of a LAN-based UMA network controller (LAN-UNC).

MS uses the address of LAN-UNC to initiate an internet key exchange (IKE) process 3028. As part of this process, MS sends its IMSI to LAN-UNC. In some embodiments, LAN-UNC restricts access to UMA services. In this case, LAN-UNC determines whether MS is authorized to access UMA services by checking a list of approved devices 3036. If MS is not an approved device, LAN-UNC sends an error message and terminates the IKE process 3032. If MS is authorized to access UMA services, LAN-UNC mediates a discovery exchange with P-UNC. As part of the discovery exchange, MS requests the FQDN of a default UMA network controller (D-UNC) 3044. LAN-UNC modifies the response from P-UNC and replaces the D-UNC addressing information with its own FQDN on the local area network 3044. MS stores the FQDN of LAN-UNC as its default UNC 3048.

In a next step 3052, MS requests a DNS lookup of its default UNC and receives a IP address for LAN-UNC. If not already done, MS initiates an IKE process 3056 with LAN-UNC. LAN-UNC determines whether MS is authorized to access UMA services 3060. If MS is not authorized to access UMA services, LAN-UNC may generate an error and terminate the IKE process 3088. This may occur, for example, if the an entry corresponding to the IMSI of MS is not found in a database of approved devices. If MS is authorized to access UMA services, LAN-UNC may proceed with a discovery process to identify the appropriate default or serving UNC for its geographic area 3068.

If UMA service is available at its current location, LAN-UNC completes a standard registration process for MS 3076. On the other hand, if UMA coverage is not available at MS's location, LAN-UNC may perform different actions. If LAN-UNC is configured to complete registration through a predetermined UNC 3080, it may proceed with internet-based registration. In this case, LAN-UNC registers MS at the predetermined UNC 3084 and the process is complete. If LAN-UNC is not configured to complete registration through a predetermined UNC, it may register MS locally 3092 and provide information necessary for MS to access LAN-based resources.

Figure 31:
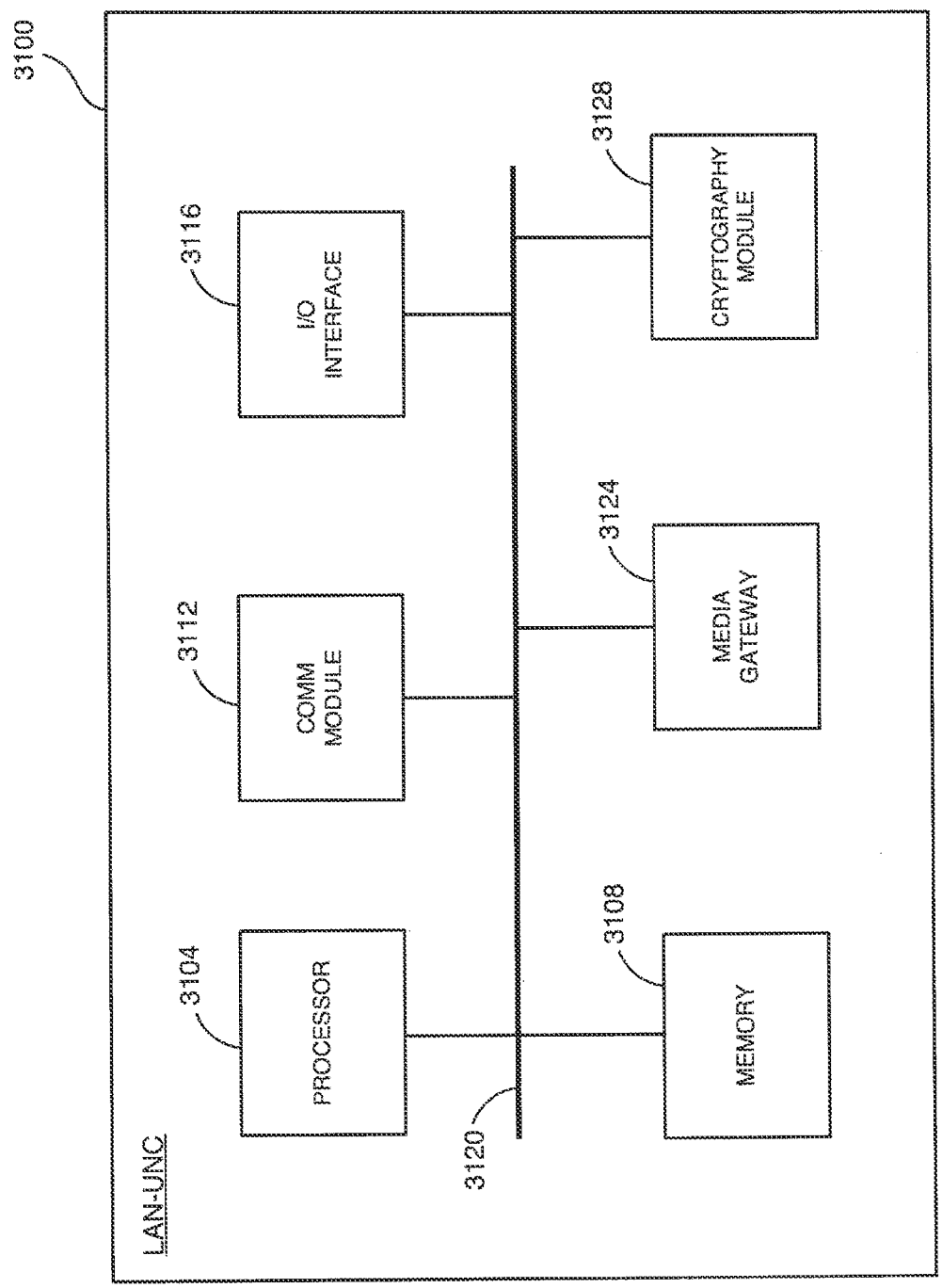
FIG. 31 is a simplified block diagram a LAN-UNC according to an embodiment of the present invention.

FIG. 31 is a block diagram of a LAN-based UMA network controller (LAN-UNC) according to an embodiment of the present invention. LAN-UNC 3100 is shown as including, in part, a processor 3104, a memory 3108 element, a communications module 3112, a cryptography module 3128, and an I/O interface 3116. In this embodiment, communications module 3112 is adapted to send and receive packets over a local area network. Communications module 3112 is further adapted to exchange data with devices connected to an external network. In some embodiments, communications module 3112 exchanges IP data packets with a serving UNC over the external network. In other embodiments, communications module 3112 may interact directly with a media gateway or IMS server.

Data packets received by communications module 3112 are transferred to processor 3104 by data bus 3120. Processor 3104 is configured to monitor data packet traffic received at communications module 3112. Depending upon their source, processor 3104 may direct packets to cryptography module 3128 for encryption or decryption of data. Process 3104 is configured to detect packets that represent UMA voice calls. When packets that represent a UMA call are detected, processor 3104 determines whether the caller UMA device is properly registered with a cellular communications network. If it is properly registered, processing continues. Otherwise, processor 3104 pauses until the registration process has been successfully completed.

After verifying that the caller UMA device is properly registered, processor 3104 determines whether the callee UMA device is connected to the local area network and able to receive calls on the local area network. This information may be stored in memory 3108. In exemplary embodiments, memory 3108 contains a device location table identifying devices that are able to communicate over the local area network. Processor 3104 may search the device location table for a unique identifier associated with the callee UMA device. In some cases, the unique identifier may be an IMSI number.

If the unique identifier is found in the device location table, processor 3104 instructs media gateway 3124 to form a connection between the caller and callee devices over the local area network. It then routes the audio portion of the call to the media gateway 3124 for delivery to its destination via this connection. In this way, call audio is maintained completely within the local area network. If the unique identifier is not found in the device location table, processor 3104 may pass call audio packets to cryptography module 3128 and then to communication module 3112 for transmission over the external network. I/O interface 3116 provides access to device settings and other configuration parameters.

While the present invention has been described in terms of specific embodiments, it should be apparent to those skilled in the art that the scope of the present invention is not limited to these specific embodiments. The specification and drawings are, accordingly, to be regarded in illustrative rather than a restrictive sense. Persons of ordinary skill in the are will recognize that additions, subtractions, substitutions, and other modifications may be made without departing from the broader spirit and scope of the invention as set forth in the claims.

What is claimed is:

1. A method comprising:
    receiving, at a first device, from a second device, first keying information that the second device uses at least to encrypt packets destined for a third device;
    receiving, at the first device, from the third device, second keying information that the third device uses at least to encrypt packets destined for the second device;
    intercepting a first encrypted packet at the first device;
    decrypting the first encrypted packet at the first device using the first keying information or the second keying information;
    processing, at the first device, data resulting from the decrypting;
    encrypting, at the first device, using the first keying information or the second keying information, data resulting from the processing;
    sending, from the first device, toward a destination specified for the first encrypted packet, a second packet containing data resulting from the encrypting;
    intercepting, at the first device, an Extensible Authentication Protocol (EAP) response message that the third device sent toward the second device;
    storing, at the first device, a value of a parameter that is indicated in the EAP response message; and
    forwarding the EAP response message from the first device to the second device.

2. The method of claim 1, further comprising:
    sending, from the first device to the second device, a first request for the first keying information;
    sending, from the first device to the third device, a second request for the second keying information;
    wherein the first keying information is received at the first device in response to the first request; and
    wherein the second keying information is received at the first device in response to the second request.

3. The method of claim 1, wherein the first device is an Unlicensed Mobile Access (UMA) network controller that resides in a local area network in which the second device is contained but in which the third device is not contained.

4. The method of claim 1, wherein receiving the first keying information comprises receiving the first keying information at the first device via the Internet from another device, said another device interfacing to both (a) the Internet and (b) a cellular network; and wherein receiving the second keying information comprises receiving the second keying information at the first device via a local area network excluding the Internet.

5. The method of claim 1, further comprising:
    sending, from the first device to another device, said another device interfacing to both (a) the Internet and (b) a cellular network, authentication credentials of the first device.

6. A network device comprising:
    means for receiving, from a second device, first keying information that the second device uses at least to encrypt packets destined for a third device;
    means for receiving, from the third device, second keying information that the third device uses at least to encrypt packets destined for the second device;
    means for intercepting a first encrypted packet;
    means for decrypting the first encrypted packet using the first keying information or the second keying information;
    means for processing data resulting from the decrypting;
    means for encrypting, using the first keying information or the second keying information, data resulting from the processing;
    means for sending, toward a destination specified for the first encrypted packet, a second packet containing data resulting from the encrypting;
    means for intercepting an Extensible Authentication Protocol (EAP) response message that the third device sent toward the second device;
    means for storing a value of a parameter that is indicated in the EAP response message; and
    means for forwarding the EAP response message to the second device.

7. The network device of claim 6, further comprising:
    means for sending, to the second device, a first request for the first keying information;
    means for sending, the third device, a second request for the second keying information;
    wherein the means for receiving the first keying information are means for receiving the first keying information in response to the first request; and
    wherein the means for receiving the second keying information are means for receiving the second keying information in response to the second request.

8. The network device of claim 6, wherein the network device is an Unlicensed Mobile Access (UMA) network controller that resides in a local area network in which the second device is contained but in which the third device is not contained.

9. The network device of claim 6, wherein the means for receiving the first keying information comprise means for receiving the first keying information via the Internet from another device, said another device interfacing to both (a) the Internet and (b) a cellular network; and wherein the means for receiving the second keying information comprise means for receiving the second keying information via a local area network excluding the Internet.

10. The network device of claim 6, further comprising:
    means for sending, to another device, said another device interfacing to both (a) the Internet and (b) a cellular network, authentication credentials of the network device.

11. A non-transitory computer-readable medium storing instructions which, when executed by one or more processors, cause the one or more processors to perform steps comprising:
    receiving, at a first device, from a second device, first keying information that the second device uses at least to encrypt packets destined for a third device;

receiving, at the first device, from the third device, second keying information that the third device uses at least to encrypt packets destined for the second device;

intercepting a first encrypted packet at the first device;

decrypting the first encrypted packet at the first device using the first keying information or the second keying information;

processing, at the first device, data resulting from the decrypting;

encrypting, at the first device, using the first keying information or the second keying information, data resulting from the processing;

sending, from the first device, toward a destination specified for the first encrypted packet, a second packet containing data resulting from the encrypting;

intercepting, at the first device, an Extensible Authentication Protocol (EAP) response message that the third device sent toward the second device;

storing, at the first device, a value of a parameter that is indicated in the EAP response message; and forwarding the EAP response message from the first device to the second device.

12. The non-transitory computer-readable medium of claim 11, wherein the steps further comprise:

sending, from the first device to the second device, a first request for the first keying information;

sending, from the first device to the third device, a second request for the second keying information;

wherein the first keying information is received at the first device in response to the first request; and wherein the second keying information is received at the first device in response to the second request.

13. The non-transitory computer-readable medium of claim 11, wherein the first device is an Unlicensed Mobile Access (UMA) network controller that resides in a local area network in which the second device is contained but in which the third device is not contained.

14. The non-transitory computer-readable medium of claim 11, wherein receiving the first keying information comprises receiving the first keying information at the first device via the Internet from another device, said another device interfacing to both (a) the Internet and (b) a cellular network; and wherein receiving the second keying information comprises receiving the second keying information at the first device via a local area network excluding the Internet.

15. The non-transitory computer-readable medium of claim 11, wherein the steps further comprise:

sending, from the first device to another device, said another device interfacing to both (a) the Internet and (b) a cellular network, authentication credentials of the first device.

* * * * *